(12) United States Patent
Liu et al.

(10) Patent No.: US 10,949,000 B2
(45) Date of Patent: Mar. 16, 2021

(54) STICKER RECOMMENDATION METHOD AND APPARATUS

(71) Applicant: Tencent Technology (Shenzhen) Company Limited, Shenzhen (CN)

(72) Inventors: Longpo Liu, Shenzhen (CN); Wei Wan, Shenzhen (CN); Lin Li, Shenzhen (CN); Qian Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 16/437,271

(22) Filed: Jun. 11, 2019

(65) Prior Publication Data

US 2019/0294259 A1  Sep. 26, 2019

Related U.S. Application Data

(63) Continuation of application No. PCT/CN2018/074136, filed on Jan. 25, 2018.

(30) Foreign Application Priority Data

Feb. 8, 2017  (CN) .......................... 201710069474.5
Feb. 13, 2017  (CN) .......................... 201710075877.0

(51) Int. Cl.
*G06F 3/023*  (2006.01)
*G06K 9/62*  (2006.01)
(Continued)

(52) U.S. Cl.
CPC ............ *G06F 3/0237* (2013.01); *G06F 16/00* (2019.01); *G06F 40/274* (2020.01); *G06K 9/626* (2013.01);
(Continued)

(58) Field of Classification Search
CPC ...... G06F 3/0233; G06F 3/0237; G06F 16/00; G06F 40/274; G06F 16/535;
(Continued)

(56) References Cited

U.S. PATENT DOCUMENTS

2009/0163183 A1\* 6/2009 O'Donoghue ......... G06Q 30/02
455/414.1
2010/0274808 A1\* 10/2010 Scholz ............... G06Q 30/0631
707/776

(Continued)

FOREIGN PATENT DOCUMENTS

CN  102880501 A  1/2013
CN  104270429 A  1/2015
(Continued)

OTHER PUBLICATIONS

Vriendt et al., "Video Content Recommendation: An Overview and Discussion on Technologies and Business Models", Bell Labs Technical Journal 16(2), 235-250 (2011). (Year: 2011).\*

(Continued)

*Primary Examiner* — Reza Nabi
*Assistant Examiner* — Hwei-Min Lu
(74) *Attorney, Agent, or Firm* — Oblon, McClelland, Maier & Neustadt, L.L.P.

(57) ABSTRACT

Aspects of the disclosure provide methods and apparatuses for recommending a sticker set. An apparatus for recommending a sticker set includes interface circuitry and processing circuitry. When the interface circuitry receives a sticker recommendation request from a terminal, the processing circuitry determines a historical sticker set that includes a sticker previously sent by a user of the terminal device, and at least one recommendable sticker set not including the historical sticker set. Then the processing circuitry determines a recommendation index for each of the (Continued)

at least one recommendable sticker set according to an emotion feature of the historical sticker set and an emotion feature of the respective recommendable sticker set. According to the recommendation index for each of the at least one recommendable sticker set, the interface circuitry sends a sticker set recommendation for one or more of the at least one recommendable sticker set to the terminal device.

31 Claims, 11 Drawing Sheets

(51) Int. Cl.
*G06N 3/08* (2006.01)
*H04L 12/58* (2006.01)
*G06F 16/00* (2019.01)
*G06F 40/274* (2020.01)

(52) U.S. Cl.
CPC ............. *G06N 3/08* (2013.01); *H04L 51/046* (2013.01); *H04L 51/10* (2013.01)

(58) Field of Classification Search
CPC .... G06F 16/583; G06K 9/6217; G06K 9/626; G06N 3/02; G06N 3/08; G06N 20/00; H04L 51/04; H04L 51/046; H04L 51/10
USPC .......................... 715/773; 707/723, 732, 734
See application file for complete search history.

(56) References Cited

U.S. PATENT DOCUMENTS

| | | | | |
|---|---|---|---|---|
| 2011/0302126 | A1* | 12/2011 | Sekino | G06Q 30/0631 707/776 |
| 2013/0066819 | A1* | 3/2013 | Nice | G06F 16/24578 706/52 |
| 2013/0124449 | A1* | 5/2013 | Pinckney | G06Q 30/0255 706/14 |
| 2014/0096037 | A1* | 4/2014 | Grosz | G06N 5/045 706/52 |
| 2015/0220774 | A1* | 8/2015 | Ebersman | G06F 3/1272 715/753 |
| 2015/0278350 | A1* | 10/2015 | Nice | G06F 3/0482 382/118 |
| 2016/0048902 | A1* | 2/2016 | Ward | G06F 16/335 707/754 |
| 2016/0212484 | A1* | 7/2016 | Kimble | G06F 16/335 707/754 |
| 2016/0359957 | A1* | 12/2016 | Laliberte | H04N 21/2668 |
| 2016/0371274 | A1* | 12/2016 | Ng | G06Q 30/0631 705/26.7 |
| 2017/0017649 | A1* | 1/2017 | Srinivasaraghavan | G06F 16/24578 |
| 2018/0357258 | A1* | 12/2018 | Bu | G06K 9/00677 |

FOREIGN PATENT DOCUMENTS

| | | |
|---|---|---|
| CN | 104683458 A | 6/2015 |
| CN | 104991914 A | 10/2015 |
| CN | 105468596 | 4/2016 |
| CN | 105518678 | 4/2016 |
| CN | 105718184 | 6/2016 |
| CN | 105763431 | 7/2016 |
| CN | 105975563 A | 9/2016 |
| JP | 2008027358 A | 2/2008 |
| WO | WO2015185019 | 12/2015 |

OTHER PUBLICATIONS

International Search Report dated Apr. 27, 2018 in International Patent Application No. PCT/CN2018/074136 with English Translation.
Written Opinion dated Apr. 27, 2018 in International Patent Application No. PCT/CN2018/074136.
Chinese Office Action dated Mar. 27, 2020 in Chinese Application No. 20170069474.5 with brief English translation. (13 pages).

* cited by examiner

STICKER RECOMMENDATION METHOD AND APPARATUS

RELATED APPLICATION

This application is a continuation of International Application No. PCT/CN2018/074136, filed on Jan. 25, 2018, which claims priority to Chinese Patent Application No. 201710069474.5, entitled "STICKER RECOMMENDATION METHOD AND APPARATUS" filed on Feb. 8, 2017, and Chinese Patent Application No. 201710075877.0, entitled "STICKER RECOMMENDATION METHOD AND APPARATUS" filed on Feb. 13, 2017. The entire disclosures of the prior applications are hereby incorporated by reference in their entirety.

FIELD OF THE TECHNOLOGY

This application relates to the field of network communications technologies.

BACKGROUND OF THE DISCLOSURE

In Internet communication, stickers for interaction are used for helping users to more accurately express information (for example, a mood or a status). For example, in an instant messaging process, a sender of instant messaging may send a sticker to a receiver as a session message.

With development of network technologies, there are more sticker sets including stickers in an Internet platform. To enable a user to find an available sticker set in time, the Internet platform recommends a sticker set to the user. Currently, the Internet platform generally preferentially recommends, to a user according to a usage popularity of sticker sets, a sticker set that is relatively popular. However, different sticker sets include different stickers, and different users like different stickers. Therefore, a sticker set recommended to a user according to the usage popularity may not be suitable for the user and consequently is not of interested to the user, and a sticker set suitable for the user cannot be found by the user in time, causing a waste of a sticker set resource in the Internet platform.

SUMMARY

Aspects of the disclosure provide methods and apparatuses for recommending a sticker set. In some examples, an apparatus for recommending a sticker set includes interface circuitry and processing circuitry.

When the interface circuitry receives a sticker recommendation request from a terminal, the processing circuitry determines a historical sticker set that includes a sticker previously sent by a user of the terminal device, and at least one recommendable sticker set not including the historical sticker set. Then the processing circuitry determines a recommendation index for each of the at least one recommendable sticker set according to an emotion feature of the historical sticker set and an emotion feature of the respective recommendable sticker set. According to the recommendation index for each of the at least one recommendable sticker set, the interface circuitry sends a sticker set recommendation for one or more of the at least one recommendable sticker set to the terminal device.

In various embodiments, when the at least one recommendable sticker set includes a plurality of recommendable sticker sets, the processing circuitry calculates a similarity between each of the recommendable sticker sets and the historical sticker set according to the emotion feature of the respective recommendable sticker set and the emotion feature of the historical sticker set. The processing circuitry further determines recommendation indexes of the plurality of recommendable sticker sets according to the similarities between the plurality of recommendable sticker sets and the historical sticker set.

According to an aspect of the disclosure, the emotion feature of the historical sticker set is determined according to an emotion feature of the sticker in the historical sticker set, the emotion feature of the sticker is a feature extracted from the sticker for reflecting an emotion status presented by the sticker.

In an embodiment, the processing circuitry determines an emotion feature of each sticker in the historical sticker set. According to an average value of the emotion features of the stickers in the historical sticker set, the processing circuitry determines the emotion feature of the historical sticker set In an embodiment, the processing circuitry determines a total quantity of usage times of each sticker in the historical sticker set and selects a specified quantity of stickers from the historical sticker set based on the total quantities of usage times. Then the processing circuitry determines a weight of each selected sticker of the specified quantity of stickers according to the total quantity of usage times of the respective selected sticker. According to the weights of the selected stickers, the processing circuitry performs a weighted summation on emotion features of the selected stickers and determines the emotion feature of the historical sticker set based on a result of the weighted summation.

In an embodiment, the processing circuitry calculates a comprehensive similarity score of each of the recommendable sticker sets according to the similarity between the recommendable sticker sets and the historical sticker set. According to the comprehensive similarity scores of the plurality of recommendable sticker sets, the processing circuitry determines the recommendation indexes of the plurality of recommendable sticker sets.

In an embodiment, the processing circuitry sums similarities between one of the plurality of recommendable sticker sets and each of a plurality of historical sticker sets, the plurality of historical sticker sets including the historical sticker set. Based on the summed similarities, the processing circuitry determines the comprehensive similarity score of the one of the plurality of recommendable sticker sets.

In an embodiment, the at least one recommendable sticker set includes a plurality of recommendable sticker sets. According to a plurality of emotion features of the plurality of recommendable sticker sets, the processing circuitry clusters the plurality of recommendable sticker sets into a plurality of classifications. Accordingly, each of the plurality of recommendable sticker sets corresponds to one of the plurality of classifications and each of the plurality of classifications includes at least one of the plurality of recommendable sticker sets. The processing circuitry determines a classification to which the historical sticker set belongs in the plurality of classifications and selects the at least one recommendable sticker set from the at least one of the plurality of recommendable sticker sets included in the classification to which the historical sticker set belongs.

In an embodiment, the processing circuitry receives a to-be-posted sticker set, extracts an emotion feature of the to-be-posted sticker set, calculate a similarity between the to-be-posted sticker set and each stored sticker set and determine whether each of the similarities between the to-be-posted sticker set and each stored sticker set is less than a preset threshold. When each of the similarities between the to-be-posted sticker set and each stored sticker set is determined to be less than the preset threshold, the processing circuitry stores the to-be-posted sticker set.

In an embodiment, the emotion feature indicates an image style of the sticker in the historical sticker set, one sticker in the at least one recommendable sticker is a specified sticker, each sticker in the historical sticker set has an image style such that the historical sticker set has at least one image style. The processing circuitry determines a usage record of the historical sticker set by the user, an uncorrected recommendation index of the specified sticker and an image style of the specified sticker. According to the usage record of the historical sticker set by the user, the at least one image style of the historical sticker set, the uncorrected recommendation index of the specified sticker, and the image style of the specified sticker, the processing circuitry determines a corrected recommendation index of the specified sticker. The interface circuitry sends the specified sticker to the terminal device when the corrected recommendation index of the specified sticker satisfies a recommendation condition.

In an embodiment, the processing circuitry generates an interest vector of the user according to the usage record of the historical sticker set by the user and the at least one image style of the historical sticker set such that each of the at least one image style of the historical sticker set corresponds to an element of the interest vector. The processing circuitry further determines the corrected recommendation index of the specified sticker according to the interest vector of the user, the image style of the specified sticker, and a preset correction formula including the uncorrected recommended index of the specified sticker.

In an embodiment, the usage record includes a quantity of usage times of the historical sticker set by the user. The processing circuitry generates an initialized interest vector according to a quantity of image styles including the at least one image style of the historical sticker set such that each element of the initialized interest vector corresponds to one of the quantity of image styles. For each of the at least one image style of the historical sticker set, the processing circuitry adds the quantity of usage times of the historical sticker set by the user to an element of the initialized interest vector that corresponds to the respective image style and generates the interest vector of the user according to a normalization of the initialized interest vector.

In an embodiment, the processing circuitry determines the uncorrected recommendation index of the specified sticker according to a collaborative-filtering-based recommendation algorithm.

In an embodiment, the processing circuitry extracts image feature information of a plurality of sample stickers and the historical sticker, the image feature information of the plurality of sample stickers corresponding to a plurality of image styles. According to the image feature information of the plurality of sample stickers and the plurality of image styles, the processing circuitry determines a machine-learning classification model. The processing circuitry further determines the image style of the historical sticker according to an output of the machine-learning classification model with an input of image feature information of the historical sticker.

Aspects of the disclosure also provide a non-transitory computer-readable medium storing instructions which when executed by a computer for recommending a sticker set cause the computer to perform the method for recommending a sticker set.

DESCRIPTION OF EMBODIMENTS

Embodiments of this application provide a sticker recommendation method and apparatus, to more properly recommend a sticker set to a user, thereby improving utilization of a sticker set resource, and avoiding a waste of the sticker set resource. It is noted that the sticker recommendation method can be used to recommend other graphical representations (e.g., emojis) in other embodiments.

Terms such as "first", "second", "third", and "fourth" (if the terms exist) in this specification, claims, and accompanying drawings of this application are used for distinguishing between similar objects instead of describing a particular sequence or order. It is understood that data termed in such a way are interchangeable in appropriate circumstances, so that the embodiments described herein can be implemented in an order other than an order illustrated or described herein. In addition, terms "include", "possess", and any variant thereof are intended to cover non-exclusive inclusion. For example, a process, method, system, product, or device that includes a list of steps or units does not need to be limited to the clearly listed steps or units, but may include other steps or units not clearly listed or inherent to the process, method, product, or device.

A sticker recommendation method in the embodiments of this application may be applied to a sticker recommendation in an Internet platform, for example, a sticker recommendation in an instant messaging application, or a sticker recommendation in scenarios such as a forum or a microblog.

Figure 1:
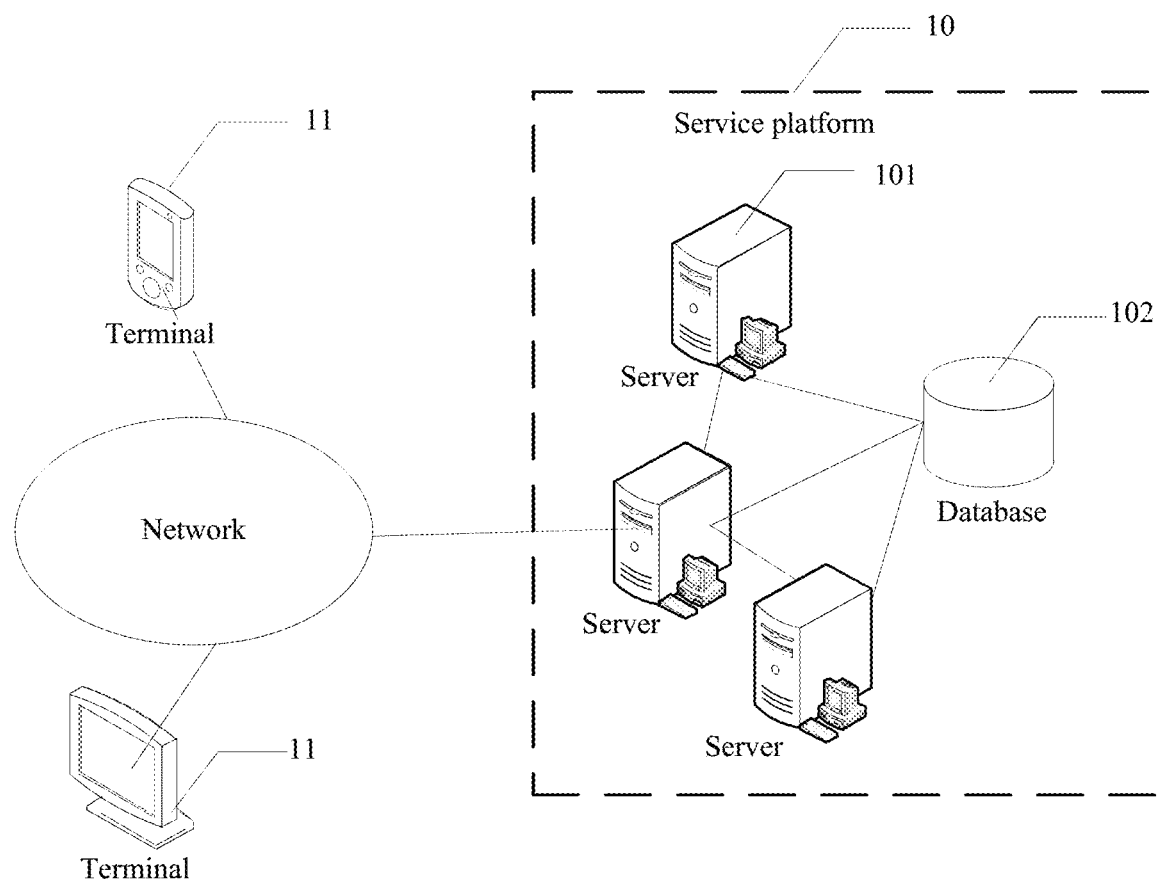
FIG. 1 is a schematic architectural composition diagram of a sticker recommendation system according to an embodiment of this application.

FIG. 1 is a schematic architectural composition diagram of a sticker recommendation system according to an embodiment of this application. The system may include a service platform 10 and at least one terminal 11.

The service platform 10 may include at least one server 101.

In an embodiment, to improve processing efficiency of the service platform 10 for processing a sticker recommendation request, the service platform 10 may include a server cluster including a plurality of servers 101.

It may be understood that a sticker set in the service platform 10 may be stored in the server or may be stored in a database. In an embodiment, the service platform may further include a database 102. The database 102 may store the sticker set in the service platform 10, or may store other data related to the service platform 10.

The terminal 11 is configured to send a sticker recommendation request to the server 101 of the service platform 10.

Correspondingly, the server 101 of the service platform 10 is configured to determine, in response to the sticker recommendation request, a sticker set list to be recommended to the terminal 11, and return the sticker set list, for example that lists at least one sticker set, to the terminal 11.

In an embodiment, the terminal 11 may be a client running an application in which sticker exchange is required. For example, the terminal 11 may be a client running an instant messaging application. Correspondingly, the service platform 10 may be a service platform for instant messaging, and the server 11 may be a server proving an instant messaging service or a server providing a sticker service related to instant messaging.

In an embodiment, the terminal 11 may be a client in which a browser is located. In the embodiment, the terminal 11 may log in to the service platform 10 by using the browser, to communicate with another network user based on the service platform 10. For example, the terminal 11 may log in to a service platform of a microblog by using the browser, to browse and comment on microblog content posted by another user or leave a message to another user. In the process of commenting on microblog content or leaving a message to another user, a user may select, in a comment bar or a message leaving bar on a microblog page by using the browser, a sticker provided by the service platform 10. The sticker may be recommended by the service platform 10 to the user.

It is noted that a scenario in which the server 101 of the service platform 10 may recommend a sticker set to the terminal 11 may further include other cases. This is not limited herein.

It may be understood that, the terminal 11 may be a device that can access the service platform 10 in a scenario. For example, the terminal 11 may be a mobile phone, a tablet computer, or a desktop computer.

Figure 2:
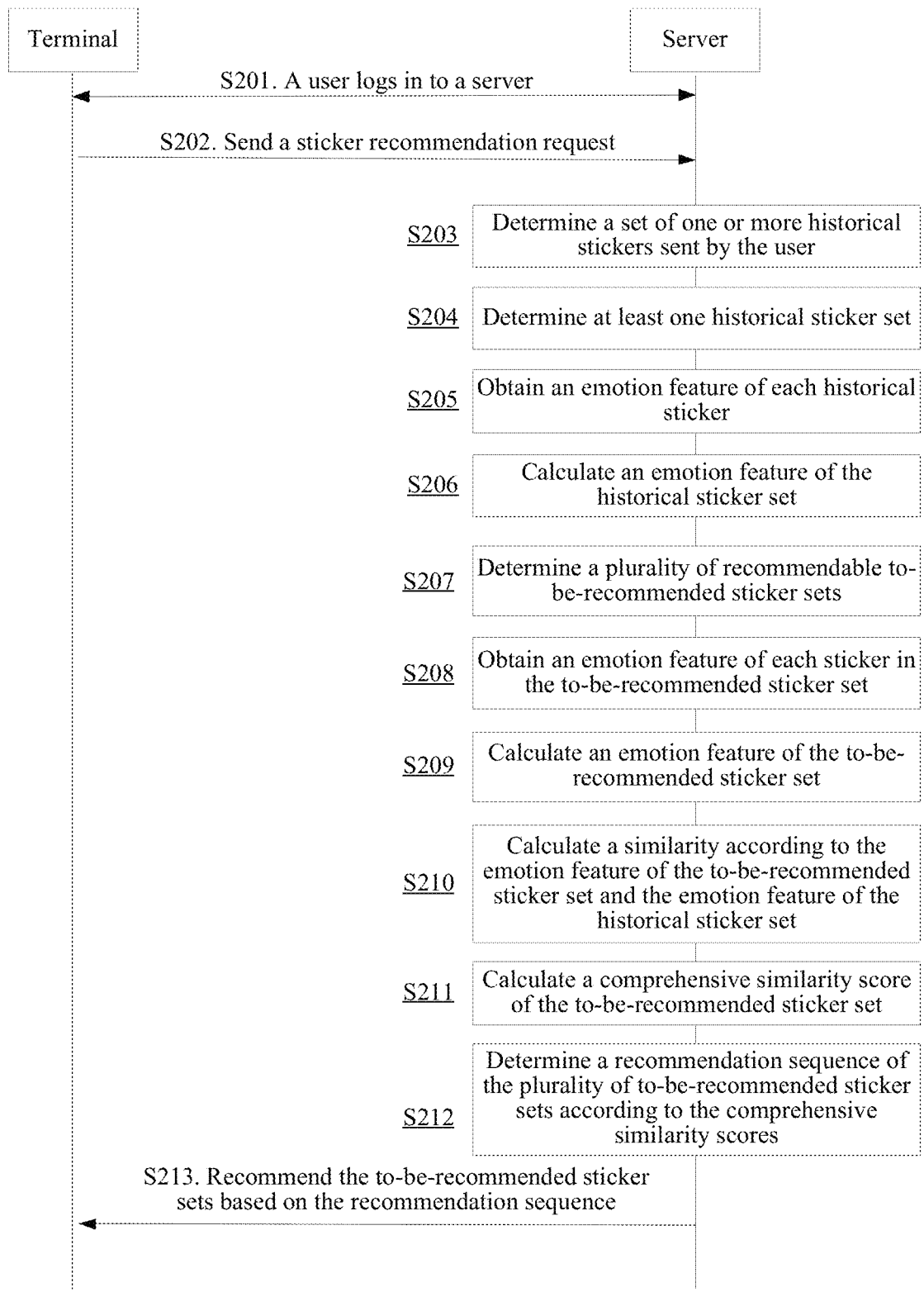
FIG. 2 is a schematic flowchart of an embodiment of a sticker recommendation method.

FIG. 2 is a schematic flowchart of an embodiment of a sticker recommendation method. The method in this embodiment may include the following steps:

In step S201, a user logs in to a server (e.g., the server 101) by using a terminal (e.g., the terminal 11).

For example, the user may log in to a server of a forum by using a browser of the terminal, to access a forum page provided by the server. In another example, the user may log in to a server of an instant messaging application by using a terminal of the instant messaging application.

Step S201 is an optional step, and is intended for ease of understanding a specific procedure of this embodiment of this application. However, it may be understood that, after logging in to the server by using the terminal, the user does not need to repeatedly log in to the server every time if subsequently needing to send a sticker recommendation request to the server.

In step S202, the terminal sends a sticker recommendation request to the server, where the sticker recommendation request carries an identifier of the user.

The sticker recommendation request is used for requesting the server to recommend a sticker set.

The sticker recommendation request may be triggered when the terminal detects that a current operation of the user satisfies a condition of recommending a sticker to the user.

For example, when detecting that the user requests to open a sticker selection list for the user to select a sticker, the terminal may send a sticker list exhibition request to the server as the sticker recommendation request. For example, when the user taps a sticker button below a comment bar of the forum, the terminal may send the sticker recommendation request to the server, so that the server recommends and returns a sticker set to the terminal, and then the terminal exhibits, to the user, the recommended sticker set, including a plurality of stickers for example, that may be selected by the user along with a sticker in the sticker set.

In another example, when detecting that the user taps a sticker recommendation option or requests to enter a sticker recommendation page, the terminal may generate the sticker recommendation request and send the sticker recommendation request to the server. For example, a sticker recommendation store or a sticker recommendation button is set in some applications. If the user requests to access the sticker recommendation store or taps the sticker recommendation button, the terminal may send the sticker recommendation request to the server, so that the server returns a sticker recommendation page such as a sticker store page including a recommended sticker set.

To help the server to identify a user that requests the server to recommend a sticker set, the sticker recommendation request may carry the identifier such as a user name, an account, or a phone number of the user. It is noted that adding the identifier of the user to the sticker recommendation request is a manner of helping the server to identify the user. In other embodiments, alternatively, the user sending the sticker recommendation request may be identified according to a communication channel allocated by the server to the user when the user logs in to the server. It is noted the user sending the sticker recommendation request may alternatively be identified in other manners. This is not limited herein.

In step S203, the server determines, in response to the sticker recommendation request, a set of one or more historical stickers sent by the user.

The set of historical stickers includes at least one historical sticker.

In step S204, the server determines at least one historical sticker set to which at least one historical sticker included in the set of historical stickers belongs.

For ease of distinguishing, in this application, a sticker sent by the user before a current time point is referred to as the historical sticker. Correspondingly, a sticker set to which the historical sticker belongs is referred to as the historical sticker set.

It may be understood that, one sticker set may include one or more stickers, and there is an association between stickers belonging to a same sticker set. For example, the stickers reflect the same subject content. A sticker in a sticker set may be a single frame of an image. For example, the sticker may include static image content. Alternatively, a sticker may be a consecutive animation, a short video, or the like. This is not limited herein.

In step S205, for a historical sticker set, the server obtains an emotion feature of each historical sticker in the historical sticker set.

An emotion feature of a sticker is, for example, a feature extracted from the sticker for reflecting an emotion status presented by the sticker. It may be understood that, an emotion feature of each sticker can be a vector. Dimensions of the vector may be set as required. For example, the emotion feature may be a vector of 1×4096 dimensions.

The emotion feature of the sticker may be obtained in real time, or may be pre-obtained and then stored. For example, the emotion feature of each historical sticker in the historical sticker set may be pre-extracted and then stored in the server or the database.

Figure 3:
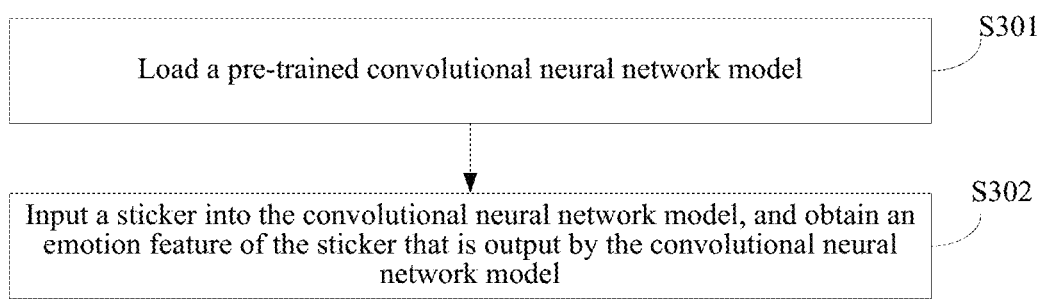
FIG. 3 is a schematic flowchart of an implementation of obtaining an emotion feature of a sticker according to an embodiment of this application.

It may be understood that, extracting the emotion feature of the sticker may be extracting an image feature of the sticker and extracting a feature that can reflect an emotion included in the sticker. The image feature of the sticker may be extracted in a plurality of feature extraction manners. For example, the sticker may be input into a pre-configured feature extraction model, to extract the emotion feature of the sticker. For ease of understanding, FIG. 3 is a schematic flowchart of extracting an emotion feature of a sticker according to this application. It may be learned from FIG. 3 that:

In step S301, a pre-trained convolutional neural network model is loaded. For example, a Visual Geometry Group (VGG) convolutional neural network model may be loaded.

In t step S302, the sticker is input into the convolutional neural network model, and the emotion feature of the sticker that is output by the convolutional neural network model is obtained.

Figure 4:
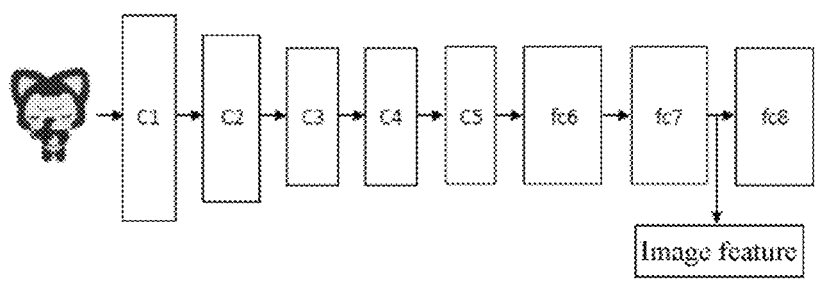
FIG. 4 is a schematic flowchart of extracting an emotion feature of a sticker by using a convolutional neural network model according to an embodiment of this application.

After the sticker is input into the convolutional neural network model, a feedforward transmission is performed on the sticker in the convolutional neural network, and the sticker sequentially passes through a convolution layer and a full connection layer of the convolutional neural network model. As shown in FIG. 4, the convolutional neural network includes the convolution layer of C1-C5 and the full connection layer corresponding to fc6, fc7, and fc8. It may be learned from FIG. 4 that, an "Ali" sticker is input into the convolutional neural network model, sequentially passes through the convolution layer indicated by C1, C2, C3, C4, and C5, and then passes through the full connection layer of fc6 and fc7. After the sticker passes through the full connection layer of fc7, an image feature of the sticker is output. The image feature is an emotion feature of the sticker.

It is noted that, when the emotion feature of the sticker is pre-extracted, the sticker may be stored in the server or the database after the server extracts the emotion feature of the sticker; or a device other than the server pre-extracts the emotion feature of the sticker, and transmits the emotion feature to the server or stores the emotion feature to the database.

In step S206, the server calculates an average value of the emotion features of all the historical stickers in the historical sticker set, and uses the average value as an emotion feature of the historical sticker set.

In an embodiment, for a sticker set, an emotion feature of the sticker set may be represented as:

$$\frac{1}{n}\sum_{i=0}^{n} x_i, \qquad \text{(formula 1)}$$

where $x_i$ is an emotion feature of a sticker i in the sticker set, $x_i$ is a vector, and n is a total quantity of stickers in the sticker set.

Correspondingly, the emotion feature of the historical sticker set may be calculated based on the formula 1 and with reference to the emotion feature of each historical sticker in the historical sticker set.

It is noted that, during determining of an emotion feature of a sticker set (e.g., the historical sticker set in step S206), the emotion feature of the sticker set may be calculated in real time in the manner described in step S205 and step S206. However, in an embodiment, to further improve efficiency of determining the emotion feature of the sticker set, the server may pre-calculate and store an emotion feature of each sticker set. For example, the emotion feature of the sticker set may be pre-calculated by the server, and stored in the server or the database. In this way, when emotion features of one or more sticker sets need to be determined, emotion features of a plurality of stored sticker sets may be queried, to obtain the emotion feature of the sticker set.

Correspondingly, for the historical sticker set, the emotion feature of the historical sticker set may be obtained from the emotion features of the plurality of stored sticker sets.

In step S207, the server determines sticker sets in a sticker set list other than the historical sticker set as a plurality of recommendable to-be-recommended sticker sets.

The sticker set list includes all available sticker sets in the service platform.

A sticker-set set not including the historical sticker set may be determined by using the sticker set list, and a plurality of sticker sets included in the sticker-set set is used as the to-be-recommended sticker sets.

It is noted that, maintaining the sticker set in the server (or the service platform) by using the sticker set list is an exemplary implementation. The server may maintain all the sticker sets by using a set or in other manners according to other embodiments.

It may be understood that, using the sticker sets other than the historical sticker set as the to-be-recommended sticker sets is an exemplary manner of determining the to-be-recommended sticker sets. This manner may be applicable to recommending, to the user, a sticker set that the user has not used and that is suitable for the user. For example, the user needs to download a sticker set before using the sticker set, and a sticker set having been downloaded by the user does not need to be repeatedly recommended to the user.

However, the server may determine the plurality of recommendable sticker sets in other manners according to other embodiments. For example, the server may use all the sticker sets (which may include a sticker set having been used by the user) in the server as the to-be-recommended sticker sets. This manner is applicable to a scenario in which the user enters a sticker in real time. For example, the user does not need to download a sticker set for use. After each time the server recommends a sticker set to the user, the user may directly use a sticker in the sticker set for network communication.

In step S208, for a to-be-recommended sticker set, the server obtains an emotion feature of each sticker in the to-be-recommended sticker set.

In step S209, the server calculates an average value of the emotion features of all the stickers in the to-be-recommended sticker set, and uses the average value as an emotion feature of the to-be-recommended sticker set.

Step S208 and step S209 are an exemplary process of determining the emotion feature of the to-be-recommended sticker set by the user. For the process, refer to the related descriptions of step S205 and 5206, and details are not described herein again.

Correspondingly, in this application, for ease of understanding, the example in which the server calculates the emotion feature of the to-be-recommended sticker set in real time is used for description. However, it may be understood that, the server may query the emotion feature of each pre-stored sticker set for the emotion feature of the to-be-recommended sticker set, to directly obtain the emotion feature of the to-be-recommended sticker set.

In step S210, for each historical sticker set, the server calculates a similarity between each to-be-recommended sticker set and the historical sticker set according to the emotion feature of each to-be-recommended sticker set and the emotion feature of the historical sticker set.

That is, for a to-be-recommended sticker set, a similarity between the to-be-recommended sticker set and each historical sticker set needs to be calculated.

For example, assuming that the user sends five historical stickers, the five historical stickers belong to three historical sticker sets that are respectively a historical sticker set A, a historical sticker set B, and a historical sticker set C, and there are 20 recommendable to-be-recommended sticker sets, a similarity between each of the 20 to-be-recommended sticker sets and the historical sticker set A needs to be calculated. Correspondingly, a similarity between each of the 20 to-be-recommended sticker sets and the historical sticker set B and a similarity between each of the 20 to-be-recommended sticker sets and the historical sticker set C are calculated.

It may be understood that, there may be a plurality of manners of determining the similarity between the to-be-recommended sticker set and the historical sticker set according to the emotion feature of the to-be-recommended sticker set and the emotion feature of the historical sticker set. For example, a cosine similarity between the emotion feature of the to-be-recommended sticker set and the emotion feature of the historical sticker set may be calculated, to obtain the similarity between the to-be-recommended sticker set and the historical sticker set. It is noted that a Euclidean distance, a Manhattan distance, or the like between the emotion feature of the to-be-recommended sticker set and the emotion feature of the historical sticker set may be calculated, to obtain the similarity between the to-be-recommended sticker set and the historical sticker set. This is not limited herein.

In step S211, for a to-be-recommended sticker set, the server calculates a comprehensive similarity score of the to-be-recommended sticker set relative to the at least one historical sticker set according to the similarity between the to-be-recommended sticker set and each historical sticker set.

The comprehensive similarity score is equivalent to a score that is determined according to the similarity between the to-be-recommended sticker set and each historical sticker set and that represents a degree of similarity between the to-be-recommended sticker set and all the historical sticker sets.

It may be understood that, there may be a plurality of implementations of calculating the comprehensive similarity score of the to-be-recommended sticker set relative to all the sticker sets according to the similarity between the to-be-recommended sticker set and each historical sticker set:

In an embodiment, the similarity between the to-be-recommended sticker set and each historical sticker set may be summed, and a summation result is used as the comprehensive similarity score of the to-be-recommended sticker set relative to the at least one sticker set. An example is used for description. The historical sticker set includes a historical sticker set A, a historical sticker set B, and a historical sticker set C. A comprehensive similarity score $score(M_i)$ of a to-be-recommended sticker set $M_i$ may be represented as follows:

$$score(M_i)=sim(A,M_i)+sim(B,M_i)+sim(C,M_i) \quad \text{(formula 2)},$$

where $sim(A,M_i)$ is a similarity between the to-be-recommended sticker set $M_i$ and the historical sticker set A, $sim(B,M_i)$ is a similarity between the to-be-recommended sticker set $M_i$ and the historical sticker set B, and $sim(C,M_i)$ is a similarity between the to-be-recommended sticker set $M_i$ and the historical sticker set C.

In an embodiment, an average value of the similarities between the to-be-recommended sticker set and all the historical sticker sets may be calculated according to the similarity between the to-be-recommended sticker set and each historical sticker set, and the calculated average value is used as the comprehensive similarity score of the to-be-recommended sticker set. Still using the formula 2 as an example, a value of $score(M_i)$ may be divided by the total quantity 3 of historical sticker sets, to obtain a similarity average value, and the similarity average value is used as the comprehensive similarity score.

In an embodiment, a total quantity of times of using the historical sticker set by the user, that is, a total sum of quantities of times of sending all the historical stickers in the historical sticker set by the user, may be first determined, and then a weight of each historical sticker set is determined according to the total quantity of times of using each historical sticker set; and for a to-be-recommended sticker set, weighted summation may be performed on the similarity between the to-be-recommended sticker set and each historical sticker set and the weight of the corresponding historical sticker set, and an obtained summation result may be determined as the comprehensive similarity score of the to-be-recommended sticker. Still using the example in which the historical sticker set includes the historical sticker sets A, B, and C, the comprehensive similarity score $score(M_i)$ of the to-be-recommended sticker set $M_i$ may be represented as follows:

$$score(M_i)=Q_A \, sim(A,M_i)+Q_B \, sim(B,M_i)+Q_c \, sim(C,M_i) \quad \text{(formula 3)},$$

where $sim(A,M_i)$, $sim(B,M_i)$, and $sim(C,M_i)$ are respectively the similarity between the to-be-recommended sticker set $M_i$ and each of the historical sticker set A, the historical sticker set B, and the historical sticker set C, and $Q_A$, $Q_B$, and $Q_c$ are respectively weights of the historical sticker set A, the historical sticker set B, and the historical sticker set C.

It is noted that the comprehensive similarity score of the to-be-recommended sticker set may alternatively be determined in other manners. This is not limited herein.

In step S212, the server determines a recommendation sequence of the plurality of to-be-recommended sticker sets according to a descending order of the comprehensive similarity scores.

For example, after the plurality of to-be-recommended sticker sets is sorted according to the descending order of the comprehensive similarity scores of the to-be-recommended sticker sets, an obtained sequence may be determined as the recommendation sequence.

It is noted that step S211 and step S212 are optional steps, and are an exemplary manner of determining the recommendation sequence of the to-be-recommended sticker sets. In an embodiment, after determining the similarity between the to-be-recommended sticker set and the historical sticker set, the server may alternatively directly determine the recommendation sequence of the plurality of to-be-recommended sticker sets according to the similarity between the to-be-recommended sticker set and the historical sticker set.

For example, priorities of different historical sticker sets are set. For example, a larger total quantity of times of using a historical sticker set by the user indicates a higher priority of the historical sticker set. Then, the recommendation sequence of the to-be-recommended sticker sets is obtained according to the priorities and the similarities.

For example, it is assumed that the historical sticker set includes historical sticker sets A and B, and there are six to-be-recommended sticker sets, namely, a to-be-recommended sticker set 1, a to-be-recommended sticker set 2, . . . , and a to-be-recommended sticker set 6. It is assumed that a descending sequence of similarities between the six to-be-recommended sticker sets and the historical sticker set A may be sequentially the to-be-recommended sticker set 6, the to-be-recommended sticker set 4, the to-be-recommended sticker set 3, the to-be-recommended sticker set 1, the to-be-recommended sticker set 5, and the to-be-recommended sticker set 2; and a descending sequence of similarities between the six to-be-recommended sticker sets and the historical sticker set B may be sequentially the to-be-recommended sticker set 5, the to-be-recommended sticker set 2, the to-be-recommended sticker set 1, the to-be-recommended sticker set 6, the to-be-recommended sticker set 3, and the to-be-recommended sticker set 4.

In addition, assuming that the historical sticker set A has a higher priority and the historical sticker set B has a lower priority, the descending sequence of the similarities between the six to-be-recommended sticker sets and the historical sticker set A may be determined as a recommendation sequence of the six to-be-recommended sticker sets. Alternatively, the to-be-recommended sticker set 6 having a highest similarity with the historical sticker set A ranks the first in the recommendation sequence, then a to-be-recommended sticker set having a highest similarity with the historical sticker set B, namely, the to-be-recommended sticker set 5, is determined in unsorted to-be-recommended sticker sets to rank the second in the recommendation sequence, and a to-be-recommended sticker set having a highest similarity with the historical sticker set A, namely, the to-be-recommended sticker set 4, is determined in unsorted to-be-recommended sticker sets to rank the third in the recommendation sequence. The rest can be deduced by analogy, to obtain the recommendation sequence as: the to-be-recommended sticker set 6, the to-be-recommended sticker set 5, the to-be-recommended sticker set 4, the to-be-recommended sticker set 2, the to-be-recommended sticker set 3, and the to-be-recommended sticker set 1.

S213. The server recommends the to-be-recommended sticker sets to the terminal based on the recommendation sequence.

It may be understood that, that the server recommends the sticker sets to the terminal according to a recommendation list may be: sending the recommendation sequence of the plurality of to-be-recommended sticker sets to the terminal, to sequentially present an identifier of each to-be-recommended sticker set on the terminal.

In an embodiment, considering that there may be relatively many recommendable sticker sets in the server other than the historical sticker set, to reduce a data transmission amount and more properly recommend the sticker set to the user, a preset quantity of target sticker sets that rank high in the recommendation sequence may be selected from the plurality of to-be-recommended sticker sets according to the recommendation sequence, and then the preset quantity of target sticker sets are recommended to the terminal according to a recommendation sequence of the preset quantity of target sticker sets. The preset quantity may be set as required. For example, the preset quantity may be 20, 30, or the like.

In an embodiment, when the server recommends the preset quantity of sticker sets to the terminal, to reduce a data computing amount, the terminal does not need to calculate the comprehensive similarity scores of all the to-be-recommended sticker sets. Correspondingly, after the similarity between the to-be-recommended sticker set and each historical sticker set is calculated in step S210, for each historical sticker set, a target quantity of to-be-recommended sticker sets having highest similarities with the historical sticker set may be selected, and then a comprehensive similarity score of each selected to-be-recommended sticker set is calculated.

For example, assuming that the historical sticker set includes historical sticker sets A, B, and C, the server may select, from all the recommendable sticker sets, n sticker sets having highest similarities with the historical sticker set A that are respectively $A_1, A_2, A_3 \ldots A_n$, n sticker sets having highest cosine similarities with the sticker set B that are respectively $B_1, B_2, B_3 \ldots B_n$, and n sticker sets having highest similarities with the sticker set C that are respectively $C_1, C_2, C_3 \ldots C_n$, n is a preset target quantity, and a value of n may be set as required. For example, the value of n may be the same as the preset quantity or may be greater than the preset quantity. Then, the server may calculate comprehensive similarity scores corresponding only to these selected sticker sets, obtain a recommendation sequence of the selected to-be-recommended sticker sets according to the comprehensive similarity scores of the selected to-be-recommended sticker sets, and finally select a preset quantity of to-be-recommended sticker sets that rank high and recommend the to-be-recommended sticker sets to the terminal.

Figure 5:
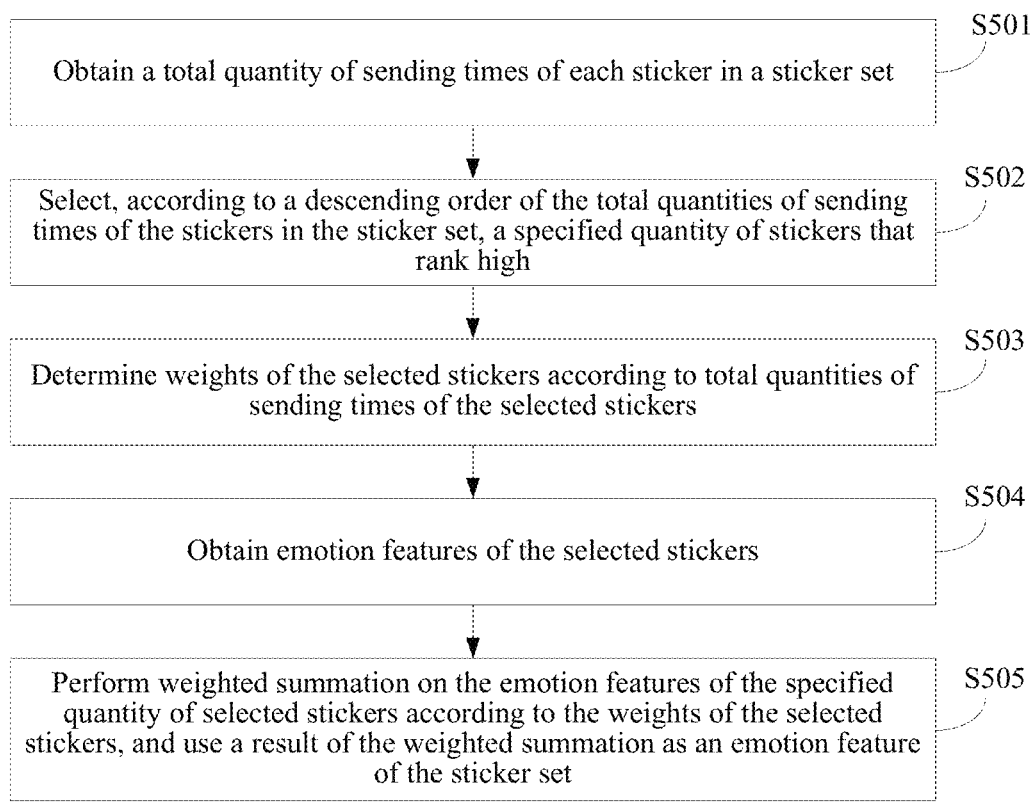
FIG. 5 is a schematic flowchart of an implementation of determining an emotion feature of a sticker set according to an embodiment of this application.

It is noted that, in the embodiment in FIG. 2, step S206 is an exemplary implementation of determining an emotion feature of a sticker set according to emotion features of stickers in the sticker set. In other embodiments, there may further be a plurality of manners of determining the emotion feature of the sticker set based on the emotion features of the stickers in the sticker set. For example, FIG. 5 is a flowchart of another implementation of determining an emotion feature of a sticker set. It may be learned from FIG. 5 that, the procedure may include the following steps:

In step S501, a total quantity of sending times of each sticker in the sticker set is obtained.

The total quantity of sending times of the sticker is, for example, a total sum of quantities of times of sending the sticker by all users on a network.

For example, a sticker H is sent by a user M1 for 10 times, is sent by a user M2 for 20 times, and is sent by a user M3 for 5 times. Therefore, a total quantity of sending times of the sticker H is 35.

In step S502, a specified quantity of sticker that rank high is selected, according to a descending order of the total quantities of sending times of the stickers in the sticker set.

The specified quantity may be set as required. For example, the specified quantity may be 5.

In step S503, weights of the selected stickers are determined according to total quantities of sending times of the selected stickers.

Generally, a larger total quantity of sending times of a sticker indicates a correspondingly larger weight of the sticker. This may be set as required.

In step S504, emotion features of the selected stickers are obtained.

For an exemplary manner of obtaining the emotion features of the stickers, refer to the related descriptions in the foregoing embodiments, and details are not described herein again.

In step S505, weighted summation on the emotion features of the specified quantity of selected stickers is performed according to the weights of the selected stickers, and a result of the weighted summation is used as the emotion feature of the sticker set.

It may be understood that, a sticker having a larger total quantity of sending times in the sticker set has an emotion feature more concerned by a user. Therefore, the specified quantity of stickers having largest total quantities of sending times are selected, and the emotion feature of the sticker set is determined according to the emotion features of the selected stickers, helping to more properly determine the emotion feature of the sticker set.

It is noted that, the procedure of determining the emotion feature of the sticker set in FIG. 5 may be applicable to a case in which the server determines an emotion feature of a sticker set in real time. Alternatively, the server may pre-perform the procedure shown in FIG. 5, to pre-obtain the emotion feature of each sticker set and store the emotion feature in the server or the database.

Figure 6:
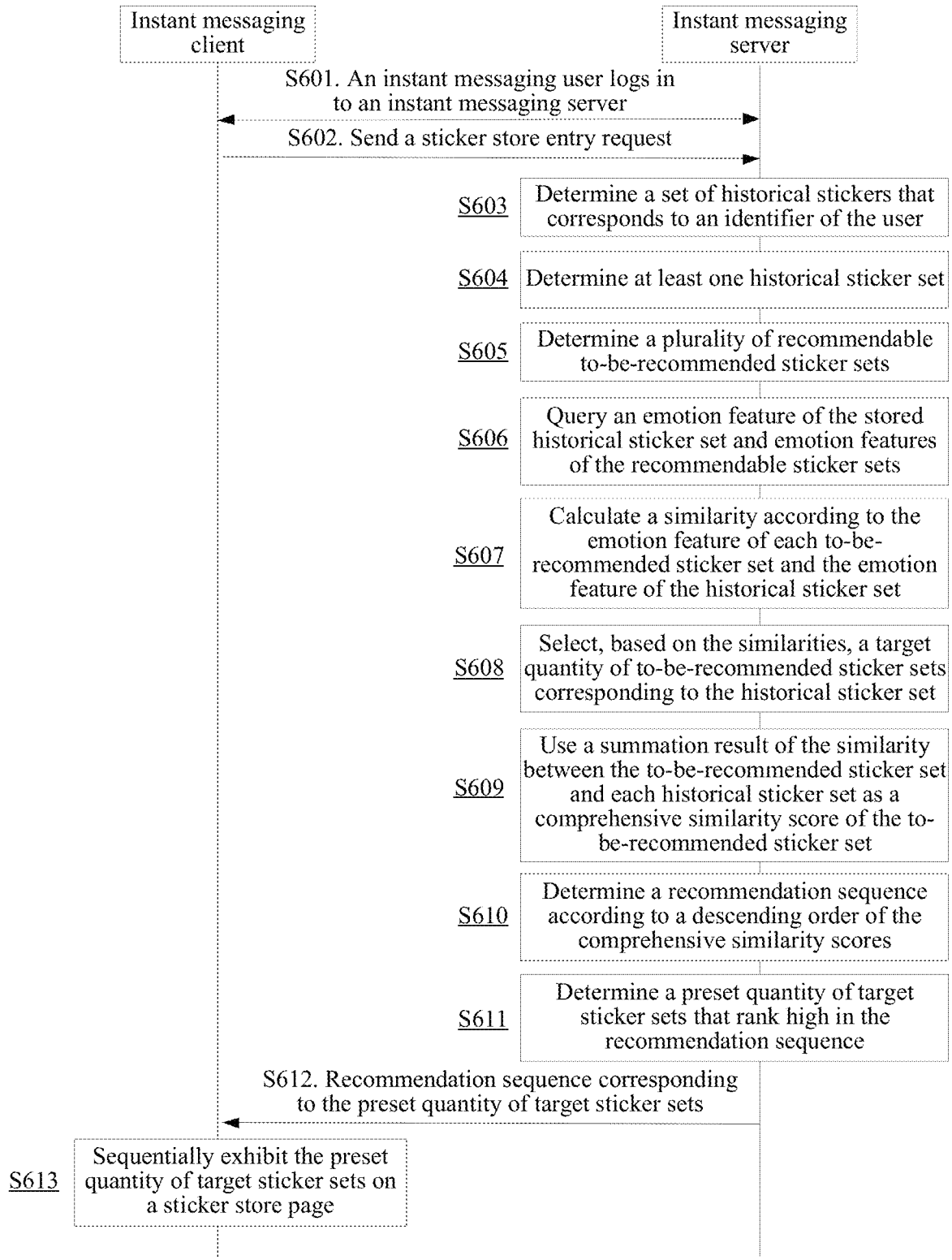
FIG. 6 is a schematic flowchart of a sticker recommendation method in an application scenario according to an embodiment of this application.

For ease of understanding the embodiments of this application, the sticker recommendation method in the embodiments of this application is described below with reference to an embodiment. An example in which an instant messaging server recommends a sticker set to an instant messaging user in an instant messaging process is used for description. FIG. 6 is a schematic flowchart of a sticker set recommendation method applied to an instant messaging embodiment according to this application. The method in this embodiment may include the following steps:

In step S601, the instant messaging user logs in to the instant messaging server by using an instant messaging client.

In step S602, the instant messaging client sends a sticker store entry request to the server if detecting that the user taps a sticker store option of an instant messaging window, where the sticker store entry request carries an identifier of the user.

Figure 7:
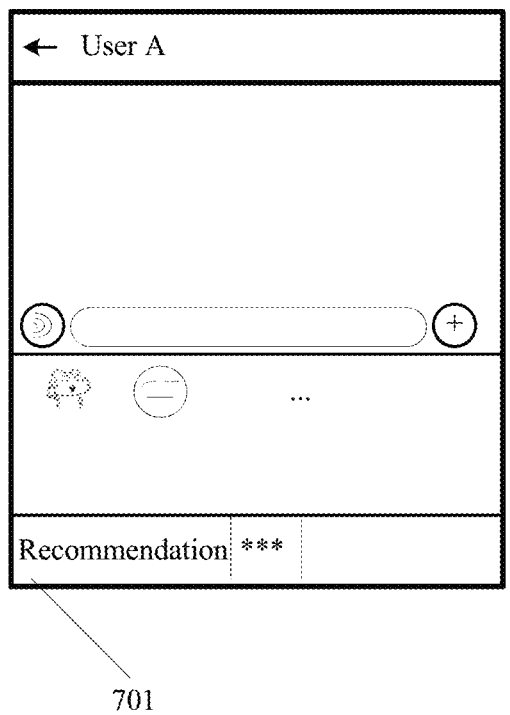
FIG. 7 is a schematic diagram of an interface including a sticker recommendation button in an instant messaging application according to an embodiment of this application.

FIG. 7 is a schematic diagram of a sticker selection interface presented on an instant messaging window. If the user taps a "sticker recommendation button" 701 used for triggering sticker recommendation on the interface, the instant messaging client is triggered to send the sticker store entry request to the server.

It is noted that FIG. 7 is merely an example. In other embodiments, except button tapping, the user may request to enter the sticker store by inputting a website or in other manners.

It is noted that, in this embodiment, the sticker store entry request is used as an example of a sticker recommendation request for description. However, it may be understood that, in different embodiments, the sticker recommendation request sent by the terminal may be different.

In step S603, the server queries, according to the identifier of the user in response to the sticker store entry request, a set of historical stickers sent by the user, where the set of historical stickers includes a plurality of historical stickers.

In step S604, the server determines at least one historical sticker set to which the plurality of historical stickers included in the set of historical stickers belongs.

In step S605, the server determines a plurality of sticker sets in a sticker set list other than the historical sticker set as recommendable to-be-recommended sticker sets.

In step S606, the server queries an emotion feature of the historical sticker set and emotion features of the recommendable sticker sets according to emotion features of stored sticker sets.

In step S607, for each historical sticker set, the server calculates a similarity between each to-be-recommended sticker set and the historical sticker set according to the emotion feature of each to-be-recommended sticker set and the emotion feature of the historical sticker set.

In step S608, for each historical sticker set, the server selects a target quantity of to-be-recommended sticker sets according to a descending sequence of the similarities between the to-be-recommended sticker sets and the historical sticker set, to obtain a plurality of selected to-be-recommended sticker sets.

It may be understood that, the target quantity of to-be-recommended sticker sets may be selected for each historical sticker set, and to-be-recommended sticker sets corresponding to different historical sticker sets may be partially the same. For example, a sticker set L may be one of a target quantity of to-be-recommended sticker sets selected for a historical sticker set A, and may further be one of a target quantity of to-be-recommended sticker sets selected for a historical sticker set B.

In step S609, for a selected to-be-recommended sticker set, the server sums the similarity between the to-be-recommended sticker set and each historical sticker set, and uses a summation result as a comprehensive similarity score of the to-be-recommended sticker set.

In step S610, the server determines a recommendation sequence of the plurality of selected to-be-recommended sticker sets according to a descending order of the comprehensive similarity scores.

In step S611, the server determines a preset quantity of target sticker sets that rank high in the recommendation sequence of the plurality of selected to-be-recommended sticker sets.

In step S612, the server sends a recommendation sequence corresponding to the preset quantity of target sticker sets to the terminal.

In step S613, the terminal sequentially exhibits the preset quantity of target sticker sets on a sticker store page according to the recommendation sequence of the preset quantity of target sticker sets.

Figure 8:
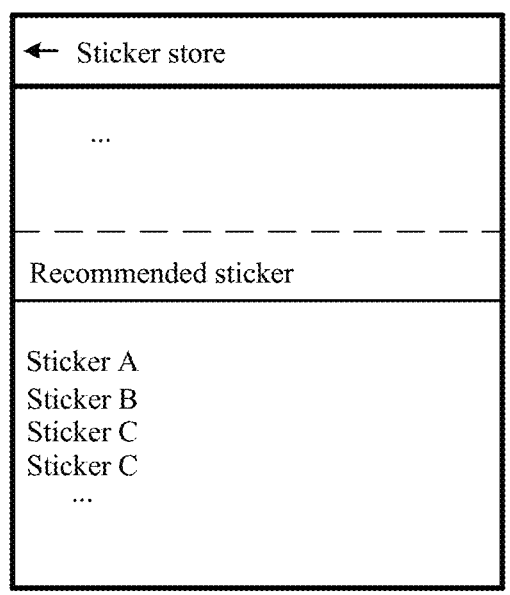
FIG. 8 is an exemplary schematic diagram of a sticker recommendation interface presented in a terminal according to a sticker set recommended by a server.

In an embodiment, the recommendation sequence corresponding to the target sticker sets that is determined by the server may include information such as identifiers of the target sticker sets and ranks of the target sticker sets in the recommendation sequence. Correspondingly, icons of the target sticker sets may be sequentially presented on the sticker store page presented in the terminal. FIG. 8 is a schematic diagram of a sticker store interface presented in a terminal. It may be learned from FIG. 8 that, there is a sticker recommendation bar in the sticker store, and a plurality of recommended sticker sets, for example, a sticker set A and a sticker set B, is exhibited in the sticker recommendation bar.

In an embodiment, to properly determine a sticker set having a relatively high degree of similarity with the historical sticker set as a recommendable sticker set and further to reduce a computing amount of the server, the server may cluster a plurality of sticker sets according to emotion features of the plurality of sticker sets, to cluster sticker sets having similar emotion features into one classification. It is noted that after a plurality of classifications is obtained through clustering, classification labels may be constructed for the classifications, to distinguish between the classifications.

Correspondingly, after determining the at least one historical sticker set to which the historical stickers sent by the user belongs, the server may determine a classification of the historical sticker set in the plurality of classifications, and then determine the plurality of recommendable to-be-recommended sticker sets in the classification of the historical sticker set. For example, a plurality of sticker sets in the classification of the historical sticker set other than the historical sticker set is used as the plurality of recommendable to-be-recommended sticker sets.

A sticker set having a same classification as that of the historical sticker set has an emotion feature whose similarity with the emotion feature of the historical sticker set is relatively large. Therefore, the plurality of sticker sets in the classification of the historical sticker set other than the historical sticker set is used as the plurality of recommendable to-be-recommended sticker sets, to decrease a quantity of to-be-recommended sticker sets while ensuring that the recommended sticker sets have relatively high similarities with the historical sticker set, thereby reducing a data computing amount needing to be consumed for calculating similarities between to-be-recommended sticker sets and the historical sticker set and for obtaining the recommendation sequence.

It may be understood that each sticker set in the server may be uploaded by a research and development personnel of the sticker to the server. A similarity between a sticker set needing to be uploaded and an existing sticker set may further be calculated based on emotion features of the sticker sets, to assist in review and screen out a plagiarized sticker set.

In an embodiment, each sticker set stored in the server may be obtained in the following manner:
obtaining a to-be-posted sticker set if receiving a request for posting a sticker set;
extracting an emotion feature of each sticker included in the to-be-posted sticker set;
determining an emotion feature of the to-be-posted sticker set according to the emotion feature of the sticker in the to-be-posted sticker set;
calculating, according to emotion features of a plurality of stored sticker sets and the emotion feature of the to-be-posted sticker set, a similarity between the to-be-posted sticker set and each stored sticker set; and
posting the to-be-posted sticker set if there is no sticker set whose similarity with the to-be-posted sticker set is less than a preset threshold in the plurality of stored sticker sets.

Figure 9:
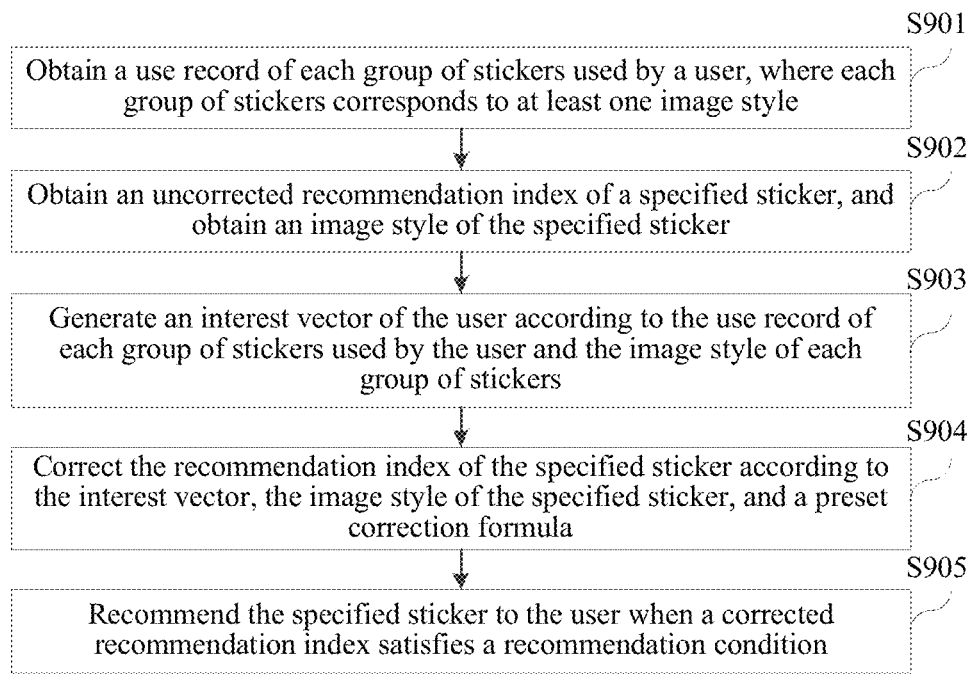
FIG. 9 is a schematic flowchart of another embodiment of a sticker recommendation method.

It may be understood that, during recommendation of a sticker set, in the embodiments of this application, a sticker may further be recommended. Referring to FIG. 9, an sticker recommendation embodiment in this application includes the following steps:

In step S901, a usage record of each group of stickers used by a user is obtained, where each group of stickers corresponds to at least one image style, and each group of stickers includes at least one pictures.

A service platform may preset a classification system of image styles of stickers. In an embodiment, image styles in a classification system may include: a cute 2D sticker, a funny 2D sticker, a cute 3D sticker, a funny 3D sticker, a real-person sticker, a real-animal sticker, a wordart sticker, and the like. Various image styles included in the classification system are merely used as an example for description. In another embodiment, the service platform may set more or fewer image styles according to different requirements. Types of the image styles in the classification system are not limited in this application.

When developing stickers, a third-party developer usually develops the stickers in sets. Each set of stickers usually includes at least two pictures (that is, each set of stickers is equivalent to the foregoing sticker set), and image styles of pictures in the same set of stickers usually remain the same. Therefore, in the present disclosure, each set of stickers may be used as a group of stickers that are of one image style.

In an embodiment, in a process in which the user uses a social network application, the user may create a sticker through doodle, may save a sticker posted by another user in the social network application, may copy a sticker from another social network application and use the sticker in the current social network application, and so on. These stickers usually independently exist and do not exist in a set with other stickers. Such stickers may each be separately processed as one group.

In an embodiment, each group of stickers may correspond only to one image style, or may correspond to two or more image styles. For example, using the classification system as an example, a group of stickers may correspond only to the image style of cute 3D sticker, or may correspond to two image styles, namely, the cute 3D sticker and the real-person sticker.

For a group of stickers, when the group of stickers includes only one picture, an image style of the group of stickers is an image style of the picture. When the group of stickers includes at least two pictures, an image style of the group of stickers is an image style of each picture in the group of stickers. For example, when a group of stickers includes 10 pictures, if an image style of the group of stickers is the cute 3D sticker, it indicates that an image style of each of the 10 pictures is the cute 3D sticker; or if an image style of the group of stickers includes two image styles, namely, the cute 3D sticker and the real-person sticker, it indicates that an image style of each of the 10 pictures includes the cute 3D sticker and the real-person sticker.

In an embodiment, the step of obtaining a usage record of each group of stickers used by a user may be performed by the server 101 shown in FIG. 1. For example, the server 101 may obtain an operation record of the user in the social network application, to extract an operation record of the user for using the stickers, and generate, through statistics, the usage record of each group of stickers used by the user.

In an embodiment, using an example in which the usage record includes a quantity of times of using each group of stickers by the user, the server 101 collects a sticker used by the user each time, and increases a quantity of use times corresponding to a group of stickers to which the sticker belongs by 1, to finally obtain the quantity of times of using each group of stickers by the user.

In an embodiment, the usage record of each group of stickers used by the user is specifically a usage record of each group of stickers having been used by the user. That is, the usage record obtained in step 901 is a usage record of each group of stickers of the user.

In an embodiment, that the user uses a sticker may be that, the user posts the sticker by using a social application message in the social network application. The social application message may be an instant messaging message or a personal dynamic. That is, that the user uses a sticker may be that, the user posts the sticker by using an instant messaging window, a group chat window, or the personal dynamic.

In an embodiment, in the process in which the user posts a sticker by using a social application message, the user may post two or more same stickers in the same social application message (where for example, the user posts a plurality of totally same stickers in a message or a personal dynamic). To avoid interference of this case and accurately collect a frequency of using each group of stickers by the user, when the server 101 collects the sticker used by the user each time, for a plurality of same stickers posted in the same social application message, a quantity of use times corresponding to a group of stickers to which the sticker belongs is increased by 1 corresponding to the social application message.

For example, using an example in which a group of stickers includes a sticker 1 and a sticker 2, when the user posts a personal dynamic, three stickers 1 and two stickers 2 are posted in one personal dynamic. Therefore, when collecting the usage record of the sticker used by the user, the server 101 increases a quantity of use times corresponding to the group of sticker by 1 for the sticker 1 in the personal dynamic, and increases the quantity of use times corresponding to the group of stickers by 1 for the sticker 2 in the personal dynamic.

In an embodiment, when the user posts two or more same stickers in the same social application message, it may be considered that the user favors the sticker. Therefore, when the server 101 collects the sticker used by the user each time, for a plurality of same stickers posted in the same social application message, the server 101 adds, corresponding to the social application message, a quantity of stickers in the social application message to a quantity of use times corresponding to a group of stickers to which the sticker belongs.

For example, using an example in which a group of stickers includes a sticker 1 and a sticker 2, when the user posts a personal dynamic, three stickers 1 and two stickers 2 are posted in one personal dynamic. Therefore, when collecting the usage record of the sticker used by the user, the server 101 increases a quantity of use times corresponding to the group of stickers by 3 for the sticker 1 in the personal dynamic, and increases the quantity of use times corresponding to the group of stickers by 2 for the sticker 2 in the personal dynamic.

In an embodiment, the user may favor an image style of a sticker in a period. For example, the user uses the cute 2D sticker for a relatively large quantity of times once in a period of time, and may prefer to use the real-person sticker in another period of time. Therefore, to improve recommendation accuracy, when obtaining the usage record of each group of stickers used by the user, the server 101 may obtain a usage record of each group of stickers used by the user in a preset-length time period closest to a current time, so that a subsequent recommendation result can be closer to a preference of the user in the last period of time. A time length of the preset-length time period may be manually set by a manager, or may be a fixed time length set in the server 101 by default. For example, assuming that the fixed time length is one month, when obtaining the usage record of each group of stickers used by the user, the server 101 may obtain a usage record of each group of stickers that is within the last month closest to the current time.

In step S902, an uncorrected recommendation index of a specified sticker is obtained, and an image style of the specified sticker is obtained.

The recommendation index may be used for indicating a priority of recommending the specified sticker to the user. For example, a larger value of the recommendation index indicates that the specified sticker is easier to be accepted by the user when the specified sticker is recommended to the user.

In an embodiment, a server cluster may calculate the uncorrected recommendation index of the specified sticker according to a collaborative-filtering-based recommendation algorithm.

In an embodiment, step S902 may be performed by the server 101 in the service platform 10 shown in FIG. 1. The collaborative-filtering-based recommendation algorithm is a general term of a type of recommendation algorithms. A core idea of the collaborative-filtering-based recommendation algorithm is: A user-item matrix, that is, a user-item (where the item is each group of stickers in this application) score matrix, is first constructed, then a user-item matrix of another user having a similar preference with a current user (that is, another user favoring the same sticker as that of the current user) is found by using the collaborative-filtering-based recommendation algorithm according to the constructed user-item matrix, and a sticker that may be liked by the user is predicted according to the user-item matrix of the another user having the similar preference with the current user.

In an embodiment, it is assumed that a higher frequency of using a group of stickers by the user indicates a higher preference of the user for the group of stickers. That is, the frequency of using each group of stickers by the user is used for replacing a user score in a general meaning. The server 101 constructs, according to the frequency of using each group of stickers by each user, a user-item matrix corresponding to each user. In a user-item matrix corresponding to a user, each element corresponds to a frequency of using one group of stickers by the user. Different users have different use habits, and in the constructed user-item matrices corresponding to different users, original values indicating frequencies of using each group of stickers by the users greatly differ from each other. Therefore, to reduce complexity in a subsequent computing process, before further processing, the server 101 normalizes the constructed user-item matrix of each user. The normalization herein means separately normalizing the user-item matrix corresponding to each user. That is, for each user, a value of each element in the user-item matrix of the user is equal to a value obtained by dividing a frequency of using a group of stickers corresponding to the element by the user by a maximum value in a frequency of using each group of stickers by the user. A formula is as follows:

$$uimatrix[u, e] = \frac{f(u, e)}{\max_{e=1}^{K}(f(u, e))}$$

f(u, e) is a frequency of using a group e of stickers by a user u, and K is a quantity of groups of all stickers. uimatrix[u,e] is a value obtained after normalization of an element corresponding to the group e of stickers in a user-item matrix corresponding to the user. Each group of stickers not used by the user (that is, each group of stickers corresponding to f(u, e)=0) is stickers needing to be predictively scored (that is, to obtain the recommendation index) by using the recommendation algorithm.

After the user-item matrix of each user is normalized, the server 101 finds out, by using the collaborative-filtering-based recommendation algorithm based on the user-item matrix of each user, the user-item matrix of the another user having the similar preference with the current user, and calculates a predictor of an element being 0 in the user-item matrix of the current user with reference to the user-item matrix of the another user having the similar preference with the current user. A sticker corresponding to the element being 0 in the user-item matrix of the current user may be the specified sticker. The recommendation index of the specified sticker may be obtained by using the predictor of the element. For example, the predictor of the element may be directly used as the recommendation index of the specified sticker. That is, for each user, a recommendation index of each group of stickers not used by the user is calculated and used as a recommendation basis.

In an embodiment, the example in which the uncorrected recommendation index is obtained based on the collaborative-filtering-based recommendation algorithm is used for description in the foregoing solution. In an embodiment, the server cluster may alternatively obtain the uncorrected recommendation index by using another type of recommendation algorithm according to a requirement of the embodiment. For example, another type of recommendation algorithm may include a content-based recommendation algorithm, an association-rule-based recommendation algorithm, a knowledge-based recommendation algorithm, and the like. Even more, the server cluster may alternatively obtain the uncorrected recommendation index according to a combination of two or more recommendation algorithms. The recommendation algorithm used by the service platform for obtaining the uncorrected recommendation index is not limited in this application.

In an embodiment, in another possible implementation, the service platform may not obtain the uncorrected recommendation index by using a specific recommendation algorithm. For example, the service platform may set the uncorrected recommendation index of the specified sticker to a fixed value, and uncorrected recommendation indexes of all to-be-recommended stickers are the same. That is, the service platform recommends a sticker to the user according only to the user record of each group of stickers used by the user but not with reference to another recommendation algorithm.

S903. Generate an interest vector of the user according to the usage record of each group of stickers used by the user and the image style of each group of stickers.

Each element in the interest vector indicates a quantity of times of using a sticker that is of one image style by the user.

In an embodiment, when the usage record includes a quantity of times of using each group of stickers by the user, a process of generating the interest vector of the user may be described in the following step a to step c.

Step a. Generate an initialized interest vector according to a quantity of image styles, where a value of an element corresponding to each image style in the initialized interest vector is 1.

When using stickers, generally, the user uses stickers of only several image styles, and may never use stickers of most image styles. To prevent the vector from being excessively sparse due to excessive values being 0 in the interest vector of the user and to improve accuracy of subsequent calculation, in the method described in the present disclosure, it may be considered by default that the user uses a sticker of each image style at least once. That is, the initialized interest vector is an all-ones vector v=[1, 1, . . . , 1], a quantity of elements in the vector v is a quantity (assuming to be n) of image styles in the classification system of the stickers, and each element in the vector v corresponds to one image style.

Step b. For each group of stickers, add a value of an element corresponding to an image style of the group of stickers in the initialized interest vector to a quantity of times of using the group of stickers by the user, to obtain a vector after the addition.

The server cluster may collect all the stickers used by the user and frequencies of the stickers according to the usage record. For each group of stickers and a corresponding use frequency m, the element, for example, an $i^{th}$ element, corresponding the image style corresponding to the group of stickers in the vector v is determined, and then m is added to the $i^{th}$ element in the vector v, that is:

For example, assuming that the first element in the vector v corresponds to the cute 2D sticker, the second element corresponds to the funny 2D sticker, the last element corresponds to the wordart sticker, and it is determined through statistics according to the usage record that a quantity of times of using the cute 2D sticker by the user is 200, a quantity of times of using the funny 2D sticker is 0, and a quantity of times of using the wordart sticker is 30, the vector obtained through addition is v=[201, 1, . . . , 31].

In an embodiment, when one group of stickers corresponds to two or more image styles, each time the user uses a usage record of the group of stickers, quantities of times of using stickers of the two or more image styles by the user are respectively increased by 1.

For example, a group of stickers corresponds to the cute 2D sticker and the real-person sticker, and a quantity of times of using the group of stickers by the user is 10. Therefore, when quantities of times of using the cute 2D sticker and the real-person sticker by the user are collected, the quantities of times of using the cute 2D sticker and the real-person sticker by the user are respectively increased by 10 according to a usage record of the group of stickers used by the user.

Step c. Normalize the vector obtained through addition, to obtain the interest vector of the user.

When normalizing the vector obtained through addition, the server cluster may divide all elements in the vector v by a length of the vector v, so that a length of the interest vector of the user that is obtained after the normalization is 1. A normalization formula is as follows:

$$v[i] = \frac{v[i]}{\sqrt{\sum_{j=1}^{n} v[j]^2}}$$

v[i] is an $i^{th}$ element in the vector v, v[j] is a $j^{th}$ element in the vector v, and n is the length of the vector v.

S904. Correct the recommendation index of the specified sticker according to the interest vector, the image style of the specified sticker, and a preset correction formula, to obtain a corrected recommendation index.

In an embodiment, the correction formula is:

$$rp(u, e) = cf(u, e) * \left(1 + \left(\frac{2}{1 + \exp(-0.1 * frq(u))} - 1\right) * \text{var}(v(u)) * sim(e, v(u))\right)$$

rp(u,e) is the corrected recommendation index, cf(u,e) is the uncorrected recommendation index, and v(u) is the interest vector of the user.

In addition, frq(u) is an average quantity of times of using the stickers by the user per unit of time period. The unit of time period may be a preset time period having fixed duration. For example, the unit of time period may be one day or an hour. The average quantity of times of using the stickers by the user per unit of time period is a quantity of use times obtained by averaging a collected total quantity of times of using each group of stickers by the user in the usage record to each unit of time period corresponding to the usage record. For example, assuming that the usage record is a usage record of the user within 30 days, the unit of time period is one day, and the collected total quantity of times of using the stickers by the user in the usage record is 10000, the average quantity of times of using the stickers by the user per unit of time period is 10000/30≈333 times.

$$\frac{2}{1 + \exp(-0.1 * frq(u))} - 1$$

in the foregoing formula is a function related to the average quantity of times of using the stickers by the user per unit of time period.

Figure 10:
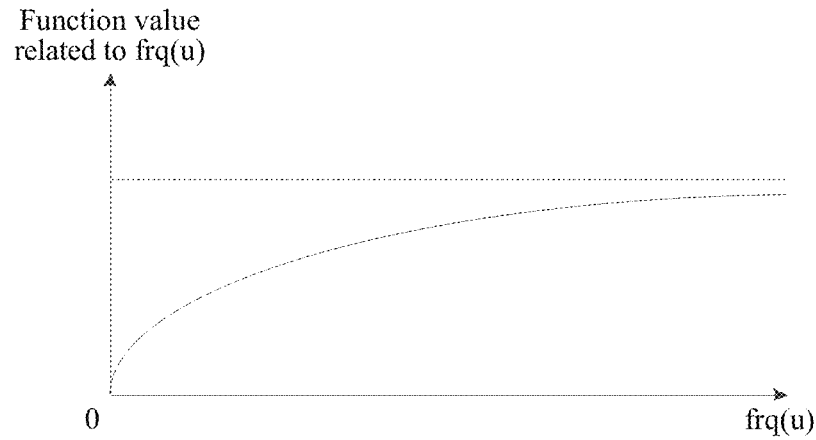
FIG. 10 is an exemplary schematic diagram of a function graph in the embodiment shown in FIG. 9.

FIG. 10 is a schematic diagram of a function graph according to an embodiment of the present disclosure. As shown in FIG. 10, the function related to the average quantity of times of using the stickers by the user per unit of time period is half an s-shaped function. When an average use frequency of the user per unit of time period is 0, a value of the function is 0, indicating that reliability of correcting the recommendation index by using the interest vector of the user is 0 and the interest vector is completely unavailable. As the average use frequency of the user per unit of time period increases, the function first increases and then gradually becomes gentle, and has a limit value of 1.0. This change trend indicates that as the average frequency of using the stickers by the user per unit of time period increases, correcting the recommendation index by using the interest vector of the user becomes more reliable.

var(v(u)) in the foregoing formula is a variance value of each element in the interest vector of the user. A first variance value indicates more centralized image styles of the stickers used by the user. Otherwise, a second variance value indicates more dispersed image styles of the stickers used by the user. If the image styles of the stickers used by the user are more centralized, an amplitude of correcting the recommendation index by using the formula is larger; otherwise, an amplitude of correcting the recommendation index by using the formula is smaller.

sim(e,v(u)) in the foregoing formula is a cosine similarity between the specified sticker and the interest vector.

When calculating the cosine similarity, the server cluster may determine an image style vector corresponding to the specified sticker. The image style vector is similar to the interest vector of the user and also includes n elements. Each element corresponds to a image style, a value of an element corresponding to the image style of the specified sticker is 1, and other elements are all 0. The server cluster selects elements not being 0 at corresponding locations in both the image style vector and the interest vector of the user, multiplies and sums the elements to obtain a value, and divides the value by lengths of the two vectors. An obtained result is the cosine similarity.

In an embodiment, when the specified sticker corresponds only to one image style, the interest vector v(u) of the user is normalized, and in vector space of the same dimensions, a value of only one element (assuming to be an $i^{th}$ element) corresponding to the specified sticker is 1 and other values are all 0. In this case, there is only one group of elements not being 0 at corresponding locations in both the image style vector and the interest vector of the user, and the lengths of the two vectors are both 1. Therefore, according to the foregoing cosine similarity calculation formula, the value of the $i^{th}$ element in the interest vector of the user is the cosine similarity. That is, when the specified sticker corresponds only to one image style, a calculation method for the cosine similarity is: first determining an element (assuming to be an $i^{th}$ element) corresponding to the image style of the specified sticker in the interest vector v(u) of the user, and then determining a value of sim(e,v(u)) as a value of the $i^{th}$ element of the vector v(u).

S905. Recommend the specified sticker to the user when the corrected recommendation index satisfies a recommendation condition.

The recommendation condition may include at least one of the following conditions:

the corrected recommendation index is greater than a preset index threshold, and a rank of the corrected recommendation index in recommendation indexes of to-be-recommended stickers is greater than a preset rank threshold.

After correcting the recommendation index of the specified sticker to be recommended to the user, the service platform may determine, according only to the corrected recommendation index of the specified sticker, whether to recommend the specified sticker. For example, the service platform may preset the index threshold (where a manager may manually set a value), and may recommend the specified sticker to the user when the corrected recommendation index is higher than the index threshold.

Alternatively, the service platform may determine, with reference to a recommendation index of another to-be-recommended sticker, whether to recommend the specified sticker. For example, the service platform may sort the to-be-recommended stickers according to corrected recommendation indexes corresponding to the to-be-recommended stickers, and recommend stickers at first x ranks to the user. If the specified sticker is in the first x ranks, the service platform recommends the specified sticker to the user. x is the rank threshold, and may be a value set by the manager in the service platform or may be a value set by default in the service platform.

Alternatively, the service platform may determine, with reference to a rank of the recommendation index and a specific value of the recommendation index, whether to recommend the specified sticker. For example, the service platform may sort the to-be-recommended stickers according to corrected recommendation index of the to-be-recommended stickers. If the specified sticker is in the first x ranks and the corrected recommendation index of the specified sticker is greater than the index threshold, the service platform recommends the specified sticker to the user. Otherwise, if the specified sticker is out of the first x ranks or the corrected recommendation index of the specified sticker is not greater than the index threshold, the service platform does not recommend the specified sticker to the user.

In an embodiment, the specified sticker may be a group of pictures in the stickers to be recommended to the user, which means that after the stickers are classified, a recommendation index of a group of stickers may be corrected by using the method described in the present disclosure. Alternatively, the specified sticker may be one of several groups of stickers having highest corresponding uncorrected recommendation indexes in the stickers to be recommended to the user.

In an embodiment, the service platform may regularly perform step S901 to step S905, for example, perform the foregoing solution by using half a month or one month as a period, to regularly update the stickers to be recommended to the user.

In conclusion, according to an embodiment of the sticker recommendation method provided in the present disclosure, after the recommendation index of the specified sticker is corrected by using the usage record of each group of stickers used by the user, the image style of each group of stickers, and the image style of the specified sticker, the sticker recommended to the user according to the corrected recommendation index is a sticker obtained by comprehensively considering a preference of the user for the image style of the sticker, to implement personalized recommendation of the sticker to the user with reference to the personal preference of the user for the image style of the sticker, thereby improving an effect of recommending a sticker to a single user.

In addition, according to an embodiment of the method provided in the present disclosure, the uncorrected recommendation index is calculated by using the collaborative-filtering-based recommendation algorithm, and the uncorrected recommendation index is corrected with reference to the personal preference of the user for the image style of the sticker, to recommend the sticker to the user with reference to the personal preference of the user and the collaborative-filtering-based recommendation algorithm.

In addition, according to n embodiment of the method provided in the present disclosure, during generation of the interest vector of the user, the initialized interest vector in which the value of the element corresponding to each image style is 1 is first generated, and the quantity of times of using the sticker of each image style is added to the initialized interest vector, to obtain the vector through addition and perform normalization processing, to prevent the vector from being excessively sparse due to excessive values of 0 in the interest vector of the user, thereby improving the accuracy of the subsequent calculation.

In addition, according to n embodiment of the method provided in the present disclosure, when the recommendation index of the specified sticker is corrected, impact of the average quantity of times of using the stickers by the user per unit of time period and interest centralization of the user on the correction is comprehensively considered, thereby improving accuracy of correction of the recommendation index.

Figure 11:
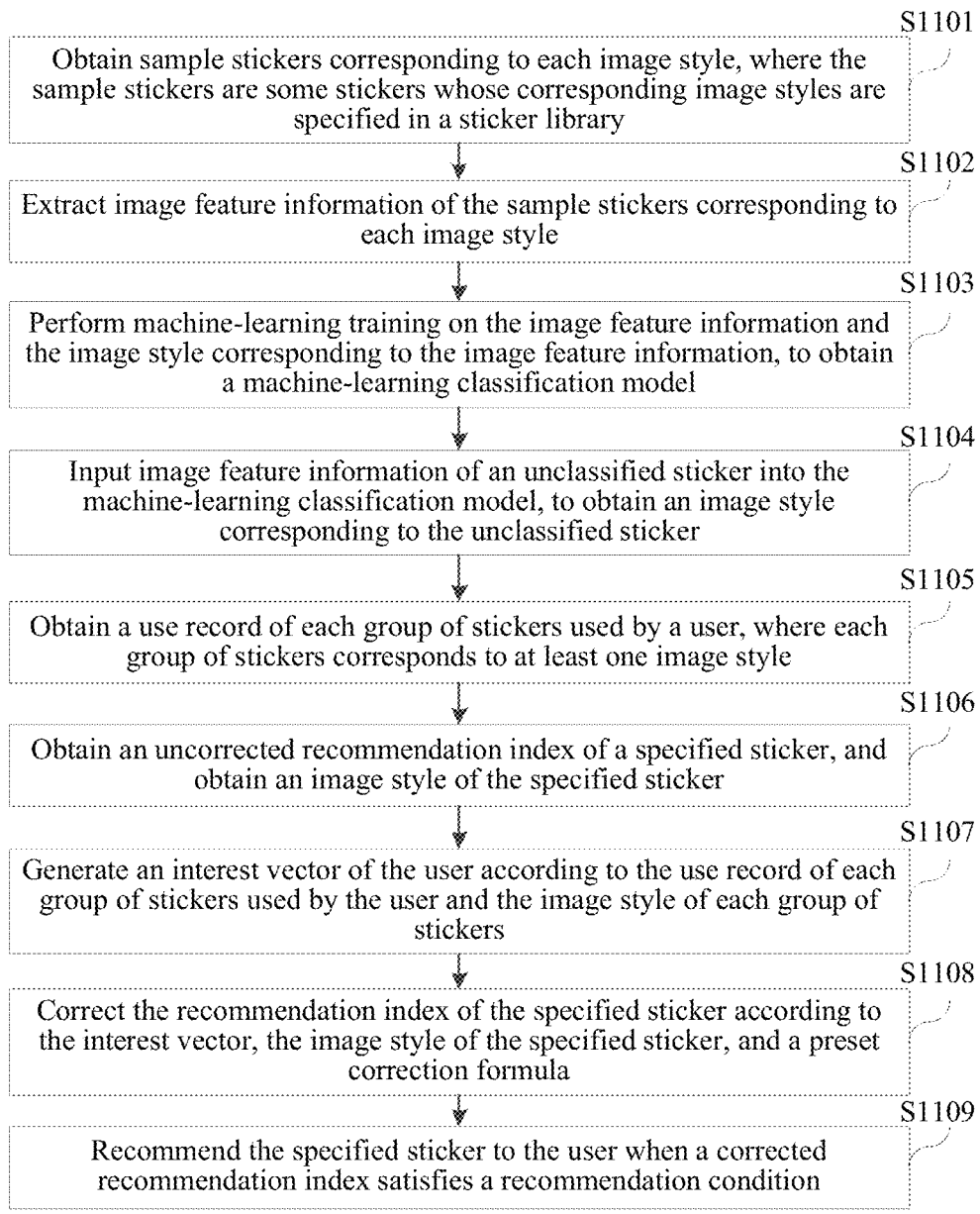
FIG. 11 is a schematic flowchart of another embodiment of a sticker recommendation method.

FIG. 11 is a flowchart of a sticker recommendation method according to an embodiment. Using an example in which the sticker recommendation method is applied to the service platform 10 in the system shown in FIG. 1, the sticker recommendation method may include the following several steps:

In S1101, sample stickers corresponding to each image style are obtained, where the sample stickers are some stickers whose corresponding image styles are specified in a sticker library.

The sticker library includes each group of stickers used by a user and a specified sticker. For example, using the system shown in FIG. 1 as an example, the sticker library may be set in the server 101 or the database 102, and the sticker library stores each group of stickers existing in the system. For a single user, in addition to each group of stickers used by the user, the sticker library further stores a specified sticker that is not used by the user and that may be recommended to the user.

In an embodiment, the sample stickers may be manually labeled by a manager. A server cluster obtains the sample stickers that are manually labeled and that correspond to each image style.

The sample stickers may be labeled in groups. For example, after constructing a classification system of image styles of stickers, the manager may first label, in all groups of stickers in the sticker library, at least one group of stickers corresponding to each image style. A quantity of groups of stickers labeled for each image style may be determined by the manager according to an actual case. For example, comprehensively considering labor costs and a subsequent machine learning effect, in a classification system having normal difficulty, 50 groups of stickers may be approximately labeled for each image style.

In step S1102, image feature information of the sample stickers corresponding to each image style is extracted.

In an embodiment, the server cluster may perform image classification by using a machine-learning classification model suitable for image classification.

Currently, machine-learning classification models suitable for image classification are mainly classified into two types. One type is a conventional machine-learning classification model, for example, a support vector machine (SVM) model, a maximum-entropy model, or a random forest model. The other type is a deep neural network model, for example, a convolutional neural network model. Manners required by the two types of machine-learning classification models for extracting image feature information are also different.

In an embodiment, if the conventional machine-learning classification model is used, the server cluster may extract the image feature information from the sample stickers corresponding to each image style by using an image feature extraction algorithm such as a scale-invariant feature transform (SIFT), speed-up robust features (SURF), oriented fast and rotated brief (ORB), a histogram of oriented gradient (HOG), or a local binary pattern (LBP).

If the deep neural network model is used, the server cluster may extract a red green blue (RGB) color value of each pixel point from the sample stickers corresponding to each image style as the image feature information.

In step S1103, machine-learning training on the image feature information and the image style corresponding to the image feature information is performed, to obtain a machine-learning classification model.

After extracting the image feature information of the sample stickers corresponding to each image style in the foregoing step, the server cluster may input the image feature information and the image style corresponding to the image feature information into a selected machine model for training, to obtain the machine-learning classification model used for sticker classification.

In step S1104, image feature information of an unclassified sticker is input into the machine-learning classification model, to obtain an image style corresponding to the unclassified sticker.

After the machine-learning classification model is trained, for each of other unclassified groups of stickers (that is, groups of stickers whose image styles are not labeled by the manager), the server cluster may extract image feature information of each group of stickers according to a corresponding machine-learning classification model, and input the image feature information of each group of stickers into the machine-learning classification model. Then, the machine-learning classification model may output an image style corresponding to each group of stickers.

In step S1105, a usage record of each group of stickers used by a user is obtained, where each group of stickers corresponds to at least one image style, and each group of stickers includes at least one pictures.

In step S1106, an uncorrected recommendation index of a specified sticker is obtained, and an image style of the specified sticker is obtained.

In step S1107, an interest vector of the user is generated according to the usage record of each group of stickers used by the user and the image style of each group of stickers.

In step S1108, the recommendation index of the specified sticker is corrected according to the interest vector, the image style of the specified sticker, and a preset correction formula, to obtain a corrected recommendation index.

In step S1109, the specified sticker is recommended to the user when the corrected recommendation index satisfies a recommendation condition.

For execution processes of step S1105 to step S1109, refer to the descriptions of step 5901 to step S905 in the embodiment shown in FIG. 9, for example, and details are not described herein again.

In conclusion, according to an embodiment of the sticker recommendation method provided in the present disclosure, after the recommendation index of the specified sticker is corrected by using the usage record of each group of stickers used by the user, the image style of each group of stickers, and the image style of the specified sticker, the sticker recommended to the user according to the corrected recommendation index is a sticker obtained by comprehensively considering a preference of the user for the image style of the sticker, to implement personalized recommendation of the sticker to the user with reference to the personal preference of the user for the image style of the sticker, thereby improving an effect of recommending a sticker to a single user.

In addition, according to an embodiment of the method provided in the present disclosure, the image feature information of the sample stickers corresponding to each image style is obtained; machine-learning training is performed on the image feature information and the image style corresponding to the image feature information, to obtain the machine-learning classification model; and the image feature information of the unclassified sticker is input into the machine-learning classification model, to obtain the image style corresponding to the unclassified sticker, thereby implementing automatic classification of the image style of each group of stickers.

Figure 12:
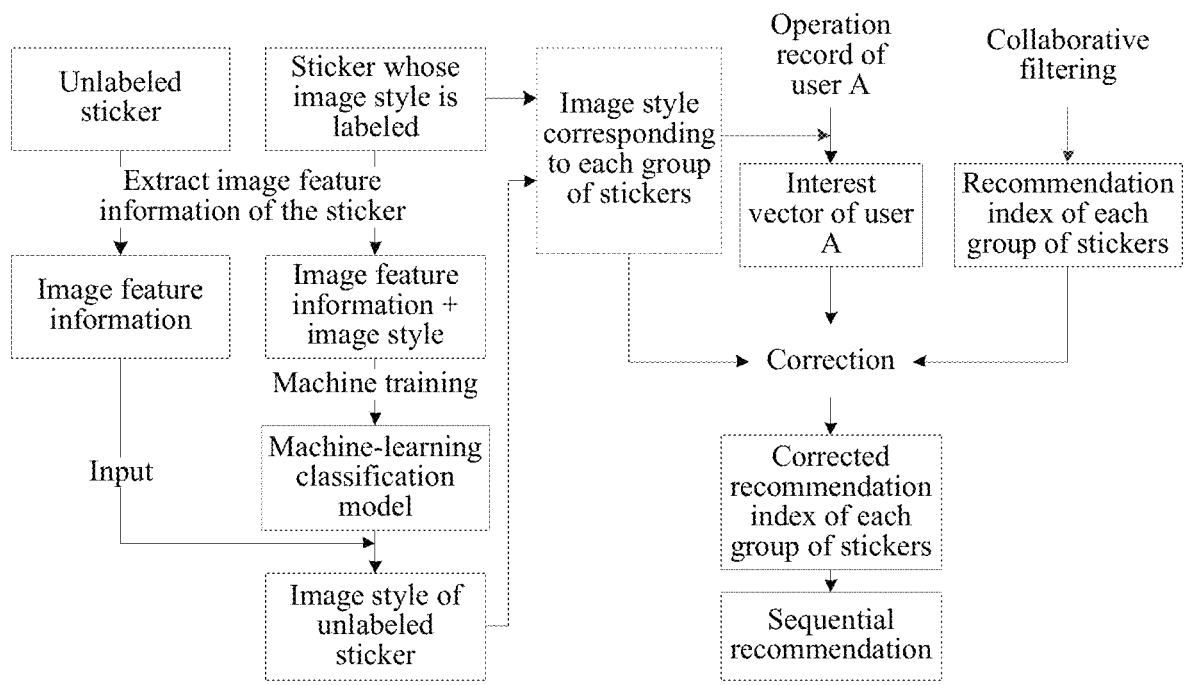
FIG. 12 is a schematic diagram of an implementation process of recommending a sticker to a user by a server cluster according to an embodiment of this application.

FIG. 12 is a schematic diagram of an implementation process of recommending a sticker to a user by a server cluster. An example in which the implementation process may be implemented by the server 101 in the server cluster shown in FIG. 1 is used. As shown in FIG. 12, a manager labels image styles of some stickers in a sticker library of the server 101 or the database 102. 50 groups of stickers are approximately labeled for each image style. The server 101 obtains the stickers whose image styles are labeled by the manager as sample stickers corresponding to each image style, extracts image feature information of the sample stickers, and performs machine learning on the extracted image feature information of the sample stickers and the image style (that is, the image style labeled by the user) corresponding to the image feature information, to obtain a machine-learning classification model. The server 101 extracts, by using the same method, image feature information of each of other groups of stickers whose image styles are not labeled in the sticker library, inputs the image feature information of each group of stickers into the machine-learning classification model, and outputs an image style corresponding to each group of stickers, to obtain the image style corresponding to each group of stickers managed in the server 101.

On the other hand, that a user A uses a social network application by using the terminal 11 includes using a sticker in the social network application. The server 101 collects an operation record of the user A. The server 101 generates, according to the operation record of the user A at an interval of a preset period, for example, at an interval of one month, a user record of each group of stickers used by the user A within the last month. The usage record includes a quantity of times of using each group of stickers by the user A.

After obtaining the usage record of each group of stickers used by the user A in the last month, the server 101 generates an interest vector of the user A with reference to the usage record and the image style of each group of stickers. In addition, the server 101 further calculates, by using a collaborative-filtering-based recommendation algorithm according to a usage record of each group of stickers used by each user A within the last month, an uncorrected recommendation index of each group of stickers that is to be recommended to the user A and that is not used by the user A. The server 101 corrects the uncorrected recommendation index by using the interest vector of the user A, sorts, according to a corrected recommendation index, each group of stickers not used by the user A, and recommends, to the user A according to a sorting result, several groups of stickers having highest recommendation indexes.

A sticker recommendation apparatus in this application is described below.

Figure 13:
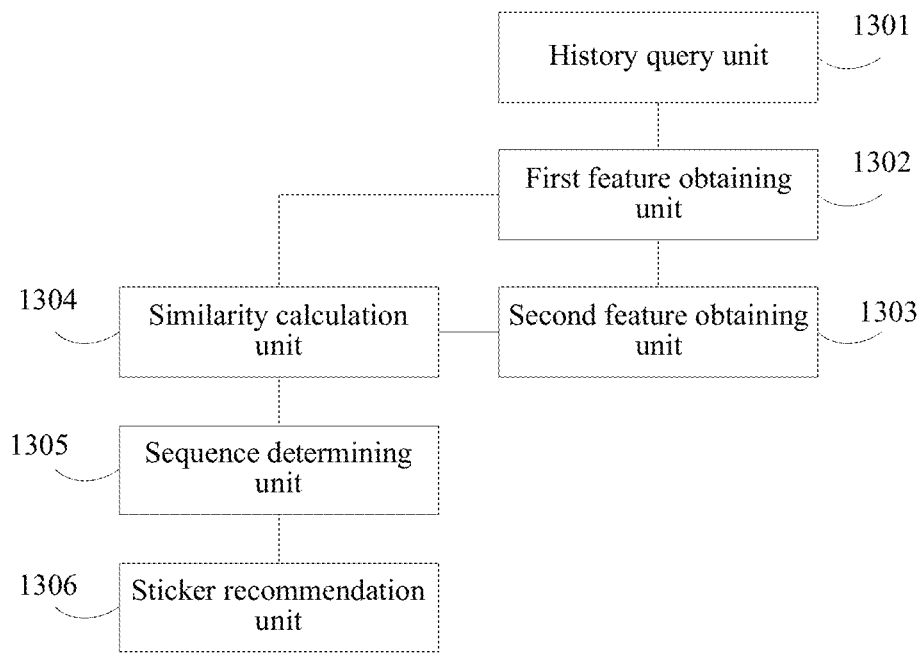
FIG. 13 is a schematic structural composition diagram of a sticker recommendation apparatus according to an embodiment of this application.

FIG. 13 is a schematic structural composition diagram of an embodiment of a sticker recommendation apparatus according to this application. The apparatus in this embodiment may include:

a history query unit 1301, configured to receive a sticker recommendation request sent by a user by using a terminal, and determine at least one historical sticker set to which a historical sticker sent by the user belongs;

a first feature obtaining unit 1302, configured to obtain an emotion feature of the historical sticker set;

a second feature obtaining unit 1303, configured to obtain emotion features of a plurality of recommendable to-be-recommended sticker sets;

a similarity calculation unit 1304, configured to: for a historical sticker set, calculate similarities between the to-be-recommended sticker sets and the historical sticker set according to the emotion features of the to-be-recommended sticker sets and the emotion feature of the historical sticker set;

a sequence determining unit 1305, configured to determine a recommendation sequence of the plurality of to-berecommended sticker sets according to the similarities between the to-be-recommended sticker sets and the historical sticker set; and a sticker recommendation unit 1306, configured to recommend the to-be-recommended sticker sets to the terminal based on the recommendation sequence.

In an embodiment, an emotion feature of a sticker set that is obtained by the first feature obtaining unit or the second feature obtaining unit is determined according to an emotion feature of a sticker in the sticker set, the emotion feature of the sticker is a feature extracted from the sticker for reflecting an emotion status presented by the sticker, and the sticker set is the historical sticker set or the to-be-recommended sticker set.

In an embodiment, the emotion feature of the sticker set in the first feature unit or the second feature unit is obtained in the following manner:

obtaining an emotion feature of each sticker in the sticker set; and calculating an average value of the emotion features of all the stickers in the sticker set, and using the calculated average value as the emotion feature of the sticker set.

In an embodiment, the first feature obtaining unit is configured to obtain the emotion feature of the historical sticker set from emotion features of a plurality of stored sticker sets.

The second feature obtaining unit is configured to obtain, from the emotion features of the plurality of stored sticker sets, the emotion features of the plurality of recommendable to-be-recommended sticker sets.

In an embodiment, the sequence determining unit includes:

a comprehensive score subunit, configured to: for a to-be-recommended sticker set, calculate a comprehensive similarity score of the to-be-recommended sticker set relative to the at least one historical sticker set according to the similarity between the to-be-recommended sticker set and each historical sticker set; and a sequence determining subunit, configured to determine the recommendation sequence of the plurality of to-be-recommended sticker sets according to a descending order of the comprehensive similarity scores.

In an embodiment, when calculating the comprehensive similarity score of the to-be-recommended sticker set relative to the at least one historical sticker set according to the similarity between the to-be-recommended sticker set and each historical sticker set, the comprehensive score subunit is configured to sum the similarity between the to-be-recommended sticker set and each historical sticker set, and use a summation result as the comprehensive similarity score of the to-be-recommended sticker set relative to the at least one sticker set.

In an embodiment, the sticker recommendation unit includes:

a recommendation selection subunit, configured to select, from the plurality of to-be-recommended sticker sets based on the recommendation sequence, a preset quantity of target sticker sets that rank high; and a sequence sending subunit, configured to send a recommendation sequence corresponding to the preset quantity of target sticker sets to the terminal.

In an embodiment, the apparatus may further include:

a sticker classification determining unit, configured to determine, after the history query unit determines the at least one historical sticker set to which the historical sticker sent by the user belongs, a classification to which the historical sticker set belongs in a plurality of classifications, where the plurality of classifications is obtained through clustering of sticker sets according to emotion features of the sticker sets in a server; and a to-be-recommended sticker set determining unit, configured to determine the plurality of recommendable to-be-recommended sticker sets in the classification to which the historical sticker set belongs.

In an embodiment, the apparatus may further include:

a sticker set obtaining unit, configured to obtain a to-be-posted sticker set if a request for posting a sticker set is received;

an emotion feature extraction unit, configured to extract an emotion feature of each sticker included in the to-be-posted sticker set;

a set feature determining unit, configured to determine an emotion feature of the to-be-posted sticker set according to the emotion feature of the sticker in the to-be-posted sticker set;

a set comparison unit, configured to calculate, according to emotion features of a plurality of stored sticker sets and the emotion feature of the to-be-posted sticker set, a similarity between the to-be-posted sticker set and each stored sticker set; and a set post control unit, configured to post the to-be-posted sticker set if there is no sticker set whose similarity with the to-be-posted sticker set is less than a preset threshold in the plurality of stored sticker sets.

An embodiment of this application further provides a server. The server may include a sticker recommendation apparatus described above.

Figure 14:
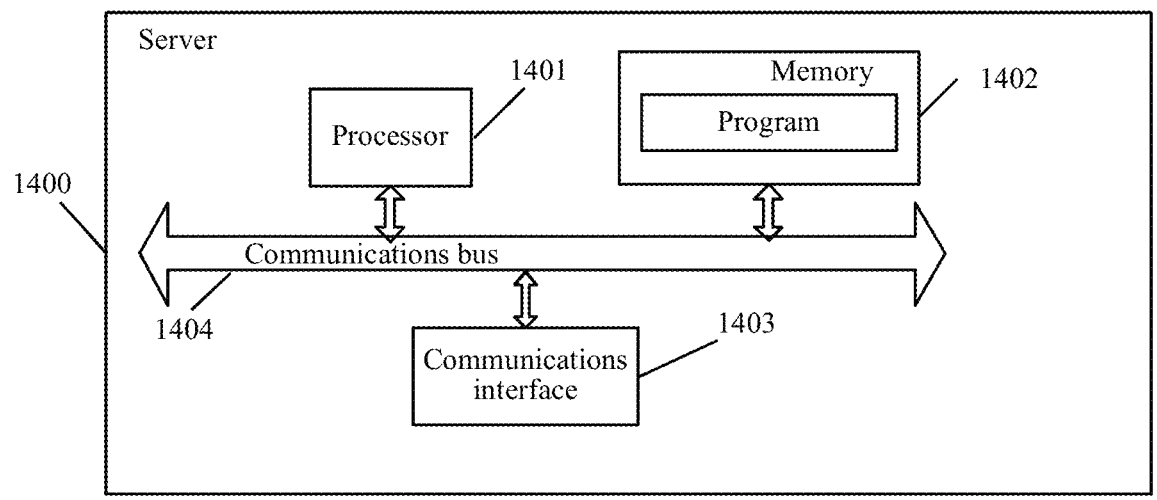
FIG. 14 is a schematic structural composition diagram of a server according to an embodiment of this application.
Figure 15:
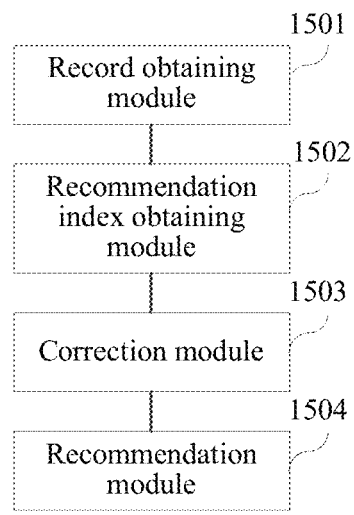
FIG. 15 is another schematic structural composition diagram of a sticker recommendation apparatus according to an embodiment of this application.

FIG. 14 is a structural block diagram of hardware of a server. Referring to FIG. 14, a server 1400 may include: a processor 1401, a communications interface 1402, a memory 1403, and a communications bus 1404.

The processor 1401, the communications interface 1402, and the memory 1403 communicate with each other via the communications bus 1404.

In an embodiment, the communications interface 1402 may be an interface of a communications module, for example, an interface of a GSM module.

The processor 1401 is configured to execute a program.

The memory 1403 is configured to store the program.

The program may include program code, and the program code includes a computer-executable instruction.

The processor 1401 may be a central processing unit (CPU) or an application-specific integrated circuit (ASIC), or may be configured as one or more integrated circuits for implementing the embodiments of the present application.

The memory 1403 may include a high-speed RAM memory, and may further include a non-volatile memory, for example, at least one magnetic disk memory.

The program may be used for:

determining, if receiving a sticker recommendation request sent by a user login to a server by using a terminal, at least one historical sticker set to which a historical sticker sent by the user belongs;

obtaining an emotion feature of the historical sticker set;

obtaining emotion features of a plurality of recommendable to-be-recommended sticker sets;

for a historical sticker set, calculating similarities between the to-be-recommended sticker sets and the historical sticker set according to the emotion features of the to-be-recommended sticker sets and the emotion feature of the historical sticker set;

determining a recommendation sequence of the plurality of to-be-recommended sticker sets according to the similarities between the to-be-recommended sticker sets and the historical sticker set; and recommending the to-be-recommended sticker sets to the terminal based on the recommendation sequence.

Based on the sticker recommendation methods shown in FIG. 9 to FIG. 12, FIG. 15 is a schematic structural composition diagram of another embodiment of a sticker recommendation apparatus according to embodiments of this application. The sticker recommendation apparatus in this embodiment may include:

a record obtaining module 1501, a recommendation index obtaining module 1502, a correction module 1503, and a recommendation module 1504.

The record obtaining module 1501 is configured to obtain a usage record of each group of stickers used by a user, where each group of stickers corresponds to at least one image style, and each group of stickers includes at least one pictures.

For a specific step performed by the record obtaining module 1501, refer to the descriptions of step S901 in FIG. 9, and details are not described herein again.

The recommendation index obtaining module 1502 is configured to obtain an uncorrected recommendation index of a specified sticker, and obtain an image style of the specified sticker, where the recommendation index is used for indicating a priority of recommending the specified sticker to the user.

The correction module 1503 is configured to correct the uncorrected recommendation index according to the usage record, the image style of each group of stickers, and the image style of the specified sticker, to obtain a corrected recommendation index.

The recommendation module 1504 is configured to recommend the specified sticker to the user when the corrected recommendation index satisfies a recommendation condition.

For a specific step performed by the recommendation module 1504, refer to the descriptions of step S905 in FIG. 9, and details are not described herein again.

In an embodiment, the correction module 1503 includes a vector generation unit and a correction unit.

The vector generation unit is configured to generate an interest vector of the user according to the usage record of each group of stickers and the image style of each group of stickers, where each element in the interest vector indicates a quantity of times of using stickers of one image style by the user.

The correction unit is configured to correct the recommendation index of the specified sticker according to the interest vector, the image style of the specified sticker, and a preset correction formula.

For a specific step performed by the correction unit, refer to the descriptions of step S904 in FIG. 9, and details are not described herein again.

In an embodiment, the usage record includes a quantity of times of using each group of stickers by the user, and the vector generation unit includes a generation subunit, an addition subunit, and a normalization subunit.

The generation subunit is configured to generate an initialized interest vector according to a quantity of image styles, where a value of an element corresponding to each image style in the initialized interest vector is 1.

The addition subunit is configured to: for each group of stickers, add a value of an element corresponding to an image style of the group of stickers in the initialized interest vector to a quantity of times of using the group of stickers by the user, to obtain a vector after the addition.

The normalization subunit is configured to normalize the vector obtained through addition, to obtain the interest vector of the user.

For a specific step performed by the vector generation unit, refer to the descriptions of step S903 in FIG. 9, and details are not described herein again.

In an embodiment, the correction formula is:

$$rp(u, e) = cf(u, e) * \left(1 + \left(\frac{2}{1 + \exp(-0.1 * frq(u))} - 1\right) * \mathrm{var}(v(u)) * sim(e, v(u))\right),$$

where $rp(u,e)$ is the corrected recommendation index, $cf(u,e)$ is the uncorrected recommendation index, $frq(u)$ is an average quantity of times of using the sticker by the user per unit of time period, $v(u)$ is the interest vector, $\mathrm{var}(v(u))$ is a variance value of each element in the interest vector, and $sim(e,v(u))$ is a cosine similarity between the specified sticker and the interest vector.

In an embodiment, the recommendation index obtaining module 1502 is configured to calculate the uncorrected recommendation index of the specified sticker according to a collaborative-filtering-based recommendation algorithm.

For a specific step performed by the recommendation index obtaining module 1502, refer to the descriptions of step S902 in FIG. 9, and details are not described herein again.

In an embodiment, the recommendation condition includes at least one of the following conditions:

the corrected recommendation index is greater than a preset index threshold; and a rank of the corrected recommendation index in recommendation indexes of to-be-recommended stickers is greater than a preset rank threshold.

In an embodiment, the apparatus further includes: a sample obtaining module, a feature extraction module, a training module, and an image style obtaining module.

The sample obtaining module is configured to obtain, before the record obtaining module obtains the usage record of each group of stickers used by the user, sample stickers corresponding to each image style, where the sample stickers are some stickers whose corresponding image styles are specified in a sticker library, and the sticker library includes each group of stickers used by the user and the specified sticker.

For a specific step performed by the sample obtaining module, refer to the descriptions of step S1101 in FIG. 11, and details are not described herein again.

The feature extraction module is configured to extract image feature information of the sample stickers corresponding to each image style.

For a specific step performed by the feature extraction module, refer to the descriptions of step S1102 in FIG. 11, and details are not described herein again.

The training module is configured to perform machine-learning training on the image feature information and the image style corresponding to the image feature information, to obtain a machine-learning classification model.

For a specific step performed by the training module, refer to the descriptions of step S1103 in FIG. 11, and details are not described herein again.

The image style obtaining module is configured to input image feature information of an unclassified sticker into the machine-learning classification model, to obtain an image style corresponding to the unclassified sticker, where the unclassified sticker is a sticker in the sticker library other than the sample stickers.

For a specific step performed by the image style obtaining module, refer to the descriptions of step S1104 in FIG. 11, and details are not described herein again.

In conclusion, according to an embodiment of the sticker recommendation apparatus provided in the present disclosure, after the recommendation index of the specified sticker is corrected by using the usage record of each group of stickers used by the user, the image style of each group of stickers, and the image style of the specified sticker, the sticker recommended to the user according to the corrected recommendation index is a sticker obtained by comprehensively considering a preference of the user for the image style of the sticker, to implement personalized recommendation of the sticker to the user with reference to the personal preference of the user for the image style of the sticker, thereby improving an effect of recommending a sticker to a single user.

In addition, according to an embodiment of the apparatus provided in the present disclosure, the uncorrected recommendation index is calculated by using the collaborative-filtering-based recommendation algorithm, and the uncorrected recommendation index is corrected with reference to the personal preference of the user for the image style of the sticker, to recommend the sticker to the user with reference to the personal preference of the user and the collaborative-filtering-based recommendation algorithm.

In addition, according to an embodiment of the apparatus provided in the present disclosure, during generation of the interest vector of the user, the initialized interest vector in which the value of the element corresponding to each image style is 1 is first generated, and the quantity of times of using the sticker that is of each image style is added to the initialized interest vector, to obtain the vector through addition and perform normalization processing, to prevent the vector from being excessively sparse due to excessive values of 0 in the interest vector of the user, thereby improving the accuracy of the subsequent calculation.

In addition, according to an embodiment of the apparatus provided in the present disclosure, when the recommendation index of the specified sticker is corrected, impact of an average quantity of times of using the stickers by the user per unit of time period and interest centralization of the user on the correction is comprehensively considered, thereby improving accuracy of correction of the recommendation index.

In addition, according to an embodiment of the apparatus provided in the present disclosure, the image feature information of the sample stickers corresponding to each image style is obtained; machine-learning training is performed on the image feature information and the image style corresponding to the image feature information, to obtain the machine-learning classification model; and the image feature information of the unclassified sticker is input into the machine-learning classification model, to obtain the image style corresponding to the unclassified sticker, thereby implementing automatic classification of the image style of each group of stickers.

It is noted that the embodiments in this specification are all described in a progressive manner. Descriptions of each embodiment focus on differences from other embodiments, and for the same or similar parts among respective embodiments, refer to each other. The apparatus embodiments are substantially similar to the method embodiments and therefore are only briefly described, and for the associated part, refer to the descriptions of the method embodiments.

The embodiments disclosed above are described to enable persons skilled in the art to implement or use the present disclosure. Various modifications to these embodiments can be made, and the general principles defined in the present disclosure may be implemented in other embodiments without departing from the spirit and scope of the present disclosure. Therefore, the present disclosure is not limited to these embodiments illustrated in the present disclosure, but needs to conform to the broadest scope consistent with the principles and novel features disclosed in the present disclosure.

Based on the sticker recommendation methods described in FIG. 9 to FIG. 12, an embodiment of this application further provides a server. The server may include a sticker recommendation apparatus described above.

Figure 16:
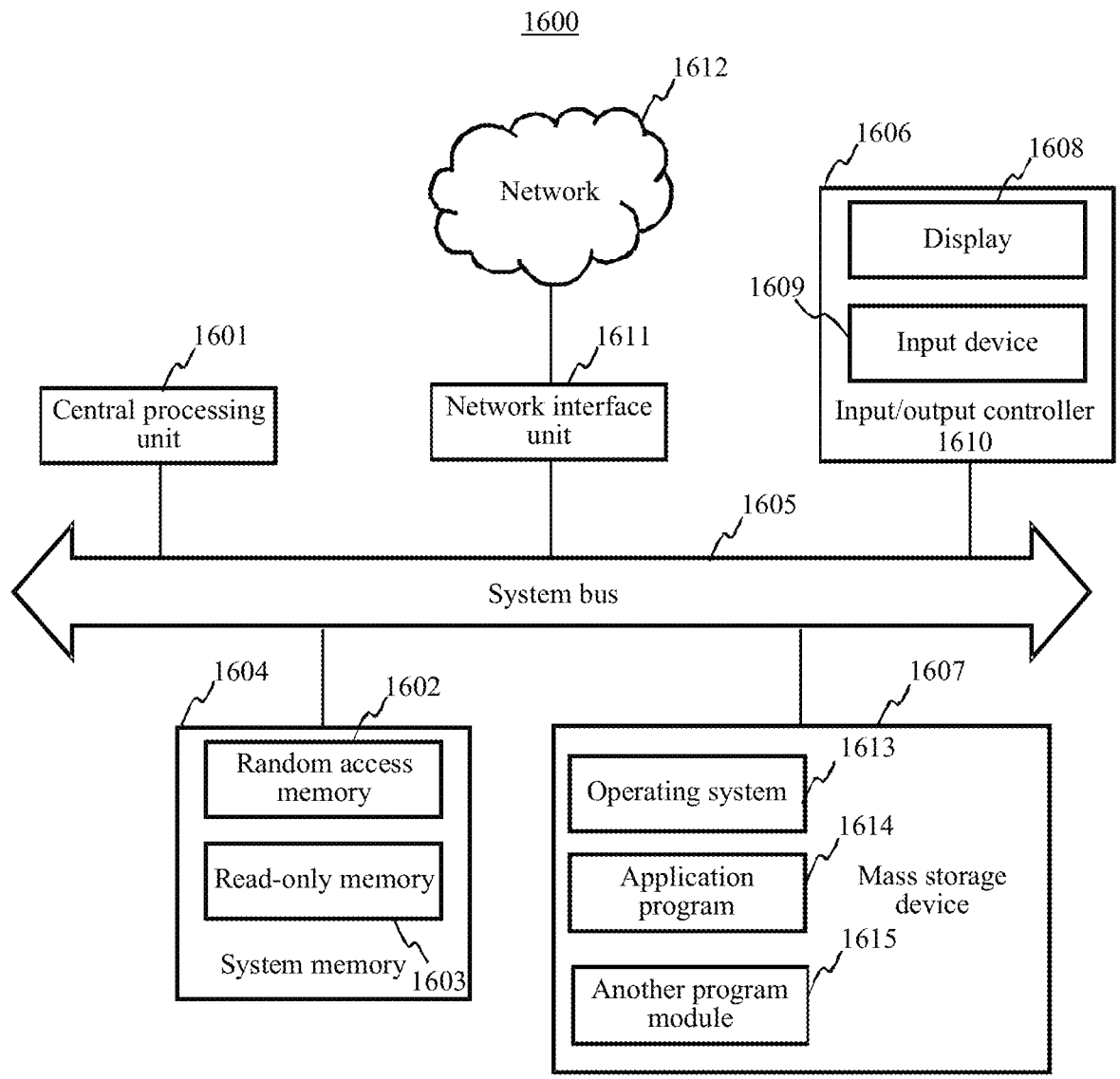
FIG. 16 is another schematic structural composition diagram of a server according to an embodiment of this application.

FIG. 16 is a structural block diagram of hardware of a server. A server 1600 includes a CPU 1601, a system memory 1604 including a random access memory (RAM) 1602 and a read-only memory (ROM) 1603, and a system bus 1605 connecting the system memory 1604 and the CPU 1601. The server 1600 further includes a basic input/output system (I/O system) 1606 helping transmit information between components in a computer, and a mass storage device 1607 configured to store an operating system 1613, an application program 1614, and another program module 1615.

The basic input/output system 1606 includes a display 1608 configured to display information and an input device 1609, such as a mouse and a keyboard, configured to input information for a user. The display 1608 and the input device 1609 are both connected to the CPU 1601 by using an input and output controller 1610 that is connected to the system bus 1605. The basic input/output system 1606 may further include the input and output controller 1610 configured to receive and process an input from a plurality of other devices such as the keyboard, the mouse, or an electronic stylus. Similarly, the input and output controller 1610 further provides an output to a display screen, a printer or another type of output device.

The mass storage device 1607 is connected to the CPU 1601 by using a mass storage controller (not shown) that is connected to the system bus 1605. The mass storage device 1607 and a computer-readable medium associated with the mass storage device 1607 provide non-volatile storage for the server 1600. That is, the mass storage device 1607 may include a computer-readable medium (not shown) such as a hard disk or a CD-ROM drive.

Without loss of generality, the computer-readable medium may include a computer storage medium and a communications medium. The computer storage medium includes volatile and non-volatile media, and removable and non-removable media implemented by using a method or technology for storing information such as a computer-readable instruction, a data structure, a program module or other data. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. It is noted that persons skilled in the art may learn that the computer storage medium is not limited to the foregoing several types. The system memory 1604 and the mass storage device 1607 may be collectively referred to as a memory.

According to various embodiments of the present disclosure, the server 1600 may further be connected to a remote computer on a network through the network such as the Internet to run. That is, the server 1600 may be connected to a network 1612 by using a network interface unit 1611 that is connected on the system bus 1605, or may be connected to a network of another type or a remote computer system (not shown) by using the network interface unit 1611.

The memory further includes one or more programs. The one or more programs are stored in the memory. The CPU 1601 executes the one or more programs to implement the sticker recommendation method shown in FIG. 9 or FIG. 12.

In an embodiment, a non-temporary computer-readable storage medium including an instruction, for example, a memory including an instruction, is further provided, and the instruction may be executed by a processor in a server to complete the sticker recommendation method in each embodiment of the present disclosure. For example, the non-transitory computer-readable storage medium may be a ROM, a RAM, a CD-ROM, a magnetic tape, a floppy disk, or an optical data storage device.

Persons skilled in the art may clearly understand that, for the purpose of convenient and brief description, for a specific working process of the foregoing system, apparatus, and unit, refer to the corresponding process in the foregoing method embodiments, and details are not described herein again.

In the several embodiments provided in this application, it is understood that the disclosed system, apparatus, and method may be implemented in other manners. For example, the described apparatus embodiment is merely an example. For example, the unit division is not limited to a logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium (e.g., a non-transitory computer-readable storage medium). Based on such an understanding, the technical solutions of this application essentially, or the part contributing to the prior art, or all or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The storage medium includes a medium that can store program code, such as a USB flash drive, a removable hard disk, a ROM, a RAM, a magnetic disk, or an optical disc.

The foregoing embodiments are intended to describe the technical solutions of this application, but not to limit this application. Although this application is described in detail with reference to the foregoing embodiments, persons of ordinary skill in the art can understand that they may still make modifications to the technical solutions set forth in the foregoing embodiments or make equivalent replacements to some technical features thereof, without departing from the spirit and scope of the technical solutions of the embodiments of this application.

What is claimed is:

1. A sticker recommendation method in a server, the method comprising:

receiving, by interface circuitry of the server, a sticker recommendation request from a terminal device;

determining, by processing circuitry of the server, a historical sticker set that includes a sticker previously sent by a user of the terminal device, and at least one recommendable sticker set not including the historical sticker set;

determining, by the processing circuitry, a recommendation index for each of the at least one recommendable sticker set according to an emotion feature of the historical sticker set and an emotion feature of the respective recommendable sticker set, the emotion feature of the historical sticker set being based on emotion features extracted from stickers in the historical sticker set, and the emotion feature of each of the at least one recommendable sticker set being based on emotion features extracted from stickers in the respective recommendable sticker set;

determining a corrected recommendation index of a specified sticker in the at least one recommendable sticker set based on an uncorrected recommendation index of the specified sticker, average usage times of the stickers in the historical sticker set by the user, a variance value of each element in an interest vector of the user, and a cosine similarity between an image style of the specified sticker and a corresponding image style of the each element in the interest vector of the user, each of the stickers in the historical sticker set having an image style such that the historical sticker set has at least one image style, and the each element in the interest vector of the user corresponding to historical usage in each of the at least one image style of the historical sticker set;

sending, by the interface circuitry, a sticker set recommendation for one or more of the at least one recommendable sticker set to the terminal device according to the determined recommendation index for each of the at least one recommendable sticker set; and sending, by the interface circuitry, a specified sticker recommendation based on the determined corrected recommendation index.

2. The method according to claim 1, wherein when the at least one recommendable sticker set includes a plurality of recommendable sticker sets, the determining the recommendation index further comprises:

calculating, by the processing circuitry, a similarity between each of the recommendable sticker sets and the historical sticker set according to the emotion feature of the respective recommendable sticker set and the emotion feature of the historical sticker set; and determining, by the processing circuitry, recommendation indexes of the plurality of recommendable sticker sets according to the similarities between the plurality of recommendable sticker sets and the historical sticker set.

3. The method according to claim 2, wherein the determining the recommendation indexes further comprises:
calculating, by the processing circuitry, comprehensive similarity scores of the recommendable sticker sets according to the similarities between the recommendable sticker sets and the historical sticker set; and
determining, by the processing circuitry, the recommendation indexes of the plurality of recommendable sticker sets according to the comprehensive similarity scores of the plurality of recommendable sticker sets.

4. The method according to claim 2, wherein the determining the recommendation indexes further comprises:
summing, by the processing circuitry, similarities between one of the plurality of recommendable sticker sets and each of a plurality of historical sticker sets, the plurality of historical sticker sets including the historical sticker set;
determining, by the processing circuitry, a comprehensive similarity score of the one of the plurality of recommendable sticker sets based on the summed similarities; and
determining, by the processing circuitry, the recommendation index of the one of the plurality of recommendable sticker sets according to the comprehensive similarity score of the one of the plurality of recommendable sticker sets.

5. The method according to claim 1, wherein
the stickers in the historical sticker set from which the emotion features are extracted include the sticker previously sent by the user, and
the emotion feature of the historical sticker set is determined according to the emotion features extracted from the stickers in the historical sticker set, the emotion features of the stickers in the historical sticker set are features extracted from the stickers in the historical sticker set for reflecting emotion statuses presented by the stickers in the historical sticker set.

6. The method according to claim 5, wherein
the stickers in the historical sticker set from which the emotion features are extracted include all stickers included in the historical sticker set, and
the emotion feature of the historical sticker set is determined based on an average value of the emotion features of the stickers in the historical sticker set.

7. The method according to claim 5, wherein the emotion feature of the historical sticker set is determined by
determining, by the processing circuitry, a total quantity of usage times for each of the stickers in the historical sticker set;
selecting, by the processing circuitry, a specified quantity of the stickers from the historical sticker set based on the total quantities of usage times;
determining, by the processing circuitry, weights for the specified quantity of the stickers selected from the historical sticker set according to the total quantity of usage times of the respective selected sticker;
performing, by the processing circuitry, a weighted summation on the emotion features of the selected stickers according to the weights of the selected stickers; and
determining, by the processing circuitry, the emotion feature of the historical sticker set based on a result of the weighted summation.

8. The method according to claim 1, wherein
the at least one recommendable sticker set includes a plurality of recommendable sticker sets, and
the determining the at least one recommendable sticker set further includes:
clustering, by the processing circuitry and according to a plurality of emotion features of the plurality of recommendable sticker sets, the plurality of recommendable sticker sets into a plurality of classifications such that each of the plurality of recommendable sticker sets corresponds to one of the plurality of classifications and each of the plurality of classifications includes at least one of the plurality of recommendable sticker sets;
determining, by the processing circuitry, a classification to which the historical sticker set belongs in the plurality of classifications; and
selecting, by the processing circuitry, the at least one recommendable sticker set from the at least one of the plurality of recommendable sticker sets included in the classification to which the historical sticker set belongs.

9. The method according to claim 1, further comprising:
receiving, by the interface circuitry, a to-be-posted sticker set;
extracting, by the processing circuitry, an emotion feature of the to-be-posted sticker set;
calculating, by the processing circuitry, a similarity between the to-be-posted sticker set and each stored sticker set;
determining, by the processing circuitry, whether the similarity between the to-be-posted sticker set and the each stored sticker set is less than a preset threshold; and
storing, by the processing circuitry, the to-be-posted sticker set when the similarity between the to-be-posted sticker set and the each stored sticker set is determined to be less than the preset threshold.

10. The method according to claim 1, further comprising:
determining, by the processing circuitry, a usage record of the historical sticker set by the user; and
determining, by the processing circuitry, the uncorrected recommendation index of the specified sticker in the at least one recommendable sticker set and the image style of the specified sticker, wherein
the determining the corrected recommendation index includes determining the corrected recommendation index of the specified sticker, according to the usage record of the historical sticker set by the user, the at least one image style of the historical sticker set, the uncorrected recommendation index of the specified sticker, and the image style of the specified sticker, and
the sending the specified sticker recommendation includes sending the specified sticker to the terminal device when the corrected recommendation index of the specified sticker satisfies a recommendation condition.

11. The method according to claim 10, wherein the determining the corrected recommendation index further comprises:
generating, by the processing circuitry, the interest vector of the user according to the usage record of the historical sticker set by the user and the at least one image style of the historical sticker set; and
determining, by the processing circuitry, the corrected recommendation index of the specified sticker according to the interest vector of the user, the image style of the specified sticker, and a preset correction formula including the uncorrected recommended index of the specified sticker.

12. The method according to claim 11, wherein, when the usage record includes a quantity of usage times of the historical sticker set by the user, the generating the interest vector of the user comprises:
generating, by the processing circuitry, an initialized interest vector according to a quantity of image styles including the at least one image style of the historical sticker set such that each element of the initialized interest vector corresponds to one of the quantity of image styles;
adding, by the processing circuitry and for each of the at least one image style of the historical sticker set, the quantity of usage times of the historical sticker set by the user to an element of the initialized interest vector that corresponds to the respective image style; and
generating, by the processing circuitry, the interest vector of the user according to a normalization of the initialized interest vector.

13. The method according to claim 11, wherein the preset correction formula is:

$$rp(u, e) = cf(u, e) * \left(1 + \left(\frac{2}{1 + \exp(-0.1 * frq(u))} - 1\right) * \text{var}(v(u)) * sim(e, v(u))\right),$$

wherein
rp(u,e) is the corrected recommendation index, cf(u,e) is the uncorrected recommendation index, frq(u) is the average quantity of usage times of the stickers in the historical sticker set by the user per unit of time period, v(u) is the interest vector of the user, var(v(u)) is the variance value of each element in the interest vector, and sim(e,v(u)) is the cosine similarity between the image style of the specified sticker and the corresponding image style of the each element in the interest vector of the user.

14. The method according to claim 10, wherein the determining the uncorrected recommendation index further comprises:
determining, by the processing circuitry, the uncorrected recommendation index of the specified sticker according to a collaborative-filtering-based recommendation algorithm.

15. The method according to claim 10, wherein the recommendation condition comprises at least one of following conditions:
the corrected recommendation index is greater than a preset index threshold; and
a rank of the corrected recommendation index in the recommendation index for each of the at least one recommendable sticker set is greater than a preset rank threshold.

16. The method according to claim 10, wherein the image style of the sticker in the historical sticker set is determined by:
extracting, by the processing circuitry, image feature information of a plurality of sample stickers and the sticker in the historical sticker set, the image feature information of the plurality of sample stickers corresponding to a plurality of image styles;
determining, by the processing circuitry, a machine-learning classification model according to the image feature information of the plurality of sample stickers and the plurality of image styles; and
determining, by the processing circuitry, the image style of the sticker in the historical sticker set according to an output of the machine-learning classification model with an input of image feature information of the sticker in the historical sticker set.

17. A sticker recommendation apparatus, comprising:
interface circuitry configured to receive a sticker recommendation request from a terminal device; and
processing circuitry configured to
determine a historical sticker set that includes a sticker previously sent by a user of the terminal device, and at least one recommendable sticker set not including the historical sticker set;
determine a recommendation index for each of the at least one recommendable sticker set according to an emotion feature of the historical sticker set and an emotion feature of the respective recommendable sticker set, the emotion feature of the historical sticker set being based on emotion features extracted from stickers in the historical sticker set, and the emotion feature of each of the at least one recommendable sticker set being based on emotion features extracted from stickers in the respective recommendable sticker set;
determine a corrected recommendation index of a specified sticker in the at least one recommendable sticker set based on an uncorrected recommendation index of the specified sticker, average usage times of the stickers in the historical sticker set by the user, a variance value of each element in an interest vector of the user, and a cosine similarity between an image style of the specified sticker and a corresponding image style of the each element in the interest vector of the user, each of the stickers in the historical sticker set having an image style such that the historical sticker set has at least one image style, and the each element in the interest vector of the user corresponding to historical usage in each of the at least one image style of the historical sticker set;
send, via the interface circuitry, a sticker set recommendation for one or more of the at least one recommendable sticker set to the terminal device according to the determined recommendation index for each of the at least one recommendable sticker set; and
send a specified sticker recommendation based on the determined corrected recommendation index.

18. The sticker recommendation apparatus according to claim 17, wherein when the at least one recommendable sticker set includes a plurality of recommendable sticker sets, the processing circuitry is further configured to:
calculate a similarity between each of the recommendable sticker sets and the historical sticker set according to the emotion feature of the respective recommendable sticker set and the emotion feature of the historical sticker set; and
determine recommendation indexes of the plurality of recommendable sticker sets according to the similarities between the plurality of recommendable sticker sets and the historical sticker set.

19. The sticker recommendation apparatus according to claim 18, wherein the processing circuitry is further configured to:

calculate comprehensive similarity scores of the recommendable sticker sets according to the similarities between the recommendable sticker sets and the historical sticker set; and determine the recommendation indexes of the plurality of recommendable sticker sets according to the comprehensive similarity scores of the plurality of recommendable sticker sets.

20. The sticker recommendation apparatus according to claim 18, wherein the processing circuitry is further configured to:

sum similarities between one of the plurality of recommendable sticker sets and each of a plurality of historical sticker sets, the plurality of historical sticker sets including the historical sticker set;

determine a comprehensive similarity score of the one of the plurality of recommendable sticker sets based on the summed similarities; and determine the recommendation index of the one of the plurality of recommendable sticker sets according to the comprehensive similarity score of the one of the plurality of recommendable sticker sets.

21. The sticker recommendation apparatus according to claim 17, wherein the stickers in the historical sticker set from which the emotion features are extracted include the sticker previously sent by the user, and the emotion feature of the historical sticker set is determined according to the emotion features extracted from the stickers in the historical sticker set, the emotion features of the stickers in the historical sticker set are features extracted from the stickers in the historical sticker set for reflecting emotion statuses presented by the stickers in the historical sticker set.

22. The sticker recommendation apparatus according to claim 21, wherein the stickers in the historical sticker set from which the emotion features are extracted include all stickers included in the historical sticker set, and the processing circuitry is further configured to determine the emotion feature of the historical sticker set based on an average value of the emotion features of the stickers in the historical sticker set.

23. The sticker recommendation apparatus according to claim 21, wherein the processing circuitry is further configured to:

determine a total quantity of usage times for each of the stickers in the historical sticker set;

select a specified quantity of the stickers from the historical sticker set based on the total quantities of usage times;

determine weights for the specified quantity of the stickers selected from the historical sticker set according to the total quantity of usage times of the respective selected sticker;

perform a weighted summation on the emotion features of the selected stickers according to the weights of the selected stickers; and determine the emotion feature of the historical sticker set based on a result of the weighted summation.

24. The sticker recommendation apparatus according to claim 17, wherein the at least one recommendable sticker set includes a plurality of recommendable sticker sets, and the processing circuitry is further configured to:

cluster, according to a plurality of emotion features of the plurality of recommendable sticker sets, the plurality of recommendable sticker sets into a plurality of classifications such that each of the plurality of recommendable sticker sets corresponds to one of the plurality of classifications and each of the plurality of classifications includes at least one of the plurality of recommendable sticker sets;

determine a classification to which the historical sticker set belongs in the plurality of classifications; and select the at least one recommendable sticker set from the at least one of the plurality of recommendable sticker sets included in the classification to which the historical sticker set belongs.

25. The sticker recommendation apparatus according to claim 17, wherein the processing circuitry is further configured to:

receive a to-be-posted sticker set;

extract an emotion feature of the to-be-posted sticker set;

calculate a similarity between the to-be-posted sticker set and each stored sticker set;

determine whether the similarity between the to-be-posted sticker set and the each stored sticker set is less than a preset threshold; and store the to-be-posted sticker set when the similarity between the to-be-posted sticker set and the each stored sticker set is determined to be less than the preset threshold.

26. The sticker recommendation apparatus according to claim 17, wherein the processing circuitry is further configured to:

determine a usage record of the historical sticker set by the user;

determine the uncorrected recommendation index of the specified sticker in the at least one recommendable sticker set and the image style of the specified sticker;

determine the corrected recommendation index of the specified sticker, according to the usage record of the historical sticker set by the user, the at least one image style of the historical sticker set, the uncorrected recommendation index of the specified sticker, and the image style of the specified sticker; and send, via the interface circuitry, the specified sticker to the terminal device when the corrected recommendation index of the specified sticker satisfies a recommendation condition.

27. The sticker recommendation apparatus according to claim 26, wherein the processing circuitry is further configured to:

generate the interest vector of the user according to the usage record of the historical sticker set by the user and the at least one image style of the historical sticker set; and determine the corrected recommendation index of the specified sticker according to the interest vector of the user, the image style of the specified sticker, and a preset correction formula including the uncorrected recommended index of the specified sticker.

28. The sticker recommendation apparatus according to claim 27, wherein the processing circuitry is further configured to:

when the usage record includes a quantity of usage times of the historical sticker set by the user, generate an initialized interest vector according to a quantity of image styles including the at least one image style of the historical sticker set such that each element of the initialized interest vector corresponds to one of the quantity of image styles;

add, for each of the at least one image style of the historical sticker set, the quantity of usage times of the historical sticker set by the user to an element of the initialized interest vector that corresponds to the respective image style; and generate the interest vector of the user according to a normalization of the initialized interest vector.

29. The sticker recommendation apparatus according to claim 26, wherein the processing circuitry is further configured to:

determine the uncorrected recommendation index of the specified sticker according to a collaborative-filtering-based recommendation algorithm.

30. The sticker recommendation apparatus according to claim 26, wherein the processing circuitry is further configured to:

extract image feature information of a plurality of sample stickers and the sticker in the historical sticker set, the image feature information of the plurality of sample stickers corresponding to a plurality of image styles;

determine a machine-learning classification model according to the image feature information of the plurality of sample stickers and the plurality of image styles; and determine the image style of the sticker in the historical sticker set according to an output of the machine-learning classification model with an input of image feature information of the sticker in the historical sticker set.

31. A non-transitory computer-readable storage medium storing a program executable by at least one processor to perform:

receiving a sticker recommendation request from a terminal device;

determining a historical sticker set that includes a sticker previously sent by a user of the terminal device, and at least one recommendable sticker set not including the historical sticker set;

determining a recommendation index for each of the at least one recommendable sticker set according to an emotion feature of the historical sticker set and an emotion feature of the respective recommendable sticker set, the emotion feature of the historical sticker set being based on emotion features extracted from stickers in the historical sticker set, and the emotion feature of each of the at least one recommendable sticker set being based on emotion features extracted from stickers in the respective recommendable sticker set;

determining a corrected recommendation index of a specified sticker in the at least one recommendable sticker set based on an uncorrected recommendation index of the specified sticker, average usage times of the stickers in the historical sticker set by the user, a variance value of each element in an interest vector of the user, and a cosine similarity between an image style of the specified sticker and a corresponding image style of the each element in the interest vector of the user, each of the stickers in the historical sticker set having an image style such that the historical sticker set has at least one image style, and the each element in the interest vector of the user corresponding to historical usage in each of the at least one image style of the historical sticker set;

sending a sticker set recommendation for one or more of the at least one recommendable sticker set to the terminal device according to the determined recommendation index for each of the at least one recommendable sticker set; and sending a specified sticker recommendation based on the determined corrected recommendation index.

* * * * *